US012726664B2

(12) United States Patent
Mallegowda et al.

(10) Patent No.: US 12,726,664 B2
(45) Date of Patent: Sep. 1, 2026

(54) METHODS AND APPARATUS FOR GENERATING A LIVE STREAM FOR A CONNECTED DEVICE

(71) Applicant: GoPro, Inc., San Mateo, CA (US)

(72) Inventors: Shiva Kumar Mallegowda, Belmont, CA (US); Pradarshan Kini Gavali, Mountain View, CA (US); Ojas Gandhi, San Ramon, CA (US)

(73) Assignee: GoPro, Inc., San Mateo, CA (US)

( * ) Notice: Subject to any disclaimer, the term of this patent is extended or adjusted under 35 U.S.C. 154(b) by 450 days.

(21) Appl. No.: 18/320,947

(22) Filed: May 19, 2023

(65) Prior Publication Data

US 2024/0373076 A1 Nov. 7, 2024

Related U.S. Application Data

(60) Provisional application No. 63/500,234, filed on May 4, 2023.

(51) Int. Cl.
*H04N 7/26* (2006.01)
*H04N 21/2187* (2011.01)
*H04N 21/2343* (2011.01)

(52) U.S. Cl.
CPC . *H04N 21/234381* (2013.01); *H04N 21/2187* (2013.01)

(58) Field of Classification Search
CPC ....... H04N 21/234381; H04N 21/2187; H04N 7/26
USPC ..................................................... 375/240.26
See application file for complete search history.

(56) References Cited

U.S. PATENT DOCUMENTS

2010/0091888 A1 * 4/2010 Nemiroff ............ H04N 19/115 375/E7.154

* cited by examiner

*Primary Examiner* — Nguyen T Truong
(74) *Attorney, Agent, or Firm* — Wang Hardoon, P.C.

(57) ABSTRACT

Systems, apparatus, and methods for selectively parsing a live stream for a connected device. GoPro® cameras capture 2 video streams for every recording: a main resolution video (MRV) and a frame aligned low-resolution video (LRV). Currently, the LRV is streamed to other devices for playback in real-time. Unfortunately, not all devices in the mobile ecosystem can keep up with these transfer and playback speeds of the LRV; thus, exemplary embodiments of the present disclosure pick frames from the LRV to provide an IDR-only version that can be replayed with minimal processing burden. As a related issue, operating codecs in parallel at different resolutions can result in misaligned frame structures since each codec independently determines its "group of pictures" (GOP), etc. The described techniques define a frame correspondence that can also be used to improve post-processing at best effort.

20 Claims, 10 Drawing Sheets

5312x2988

102

3840x2160

100

3840x2160

204
206
202
$T_0$
210
208
212
$T_1$
214
216
218
$T_2$
220
224
222
$T_3$
UNABLE TO STABILIZE
200

FIG. 2

MAIN RESOLUTION VIDEO (2704x1520 PIXELS "2.7K"@240FPS)

LOW RESOLUTION VIDEO (676x376 PIXELS@240FPS)

MAIN RESOLUTION VIDEO (2704x1520 PIXELS "2.7K"@240FPS)

LOW RESOLUTION VIDEO (676x376 PIXELS@240FPS)

TRANSCODED LOW RESOLUTION LIVE STREAM (30FPS, IDR ONLY)

IDR
PKT

612
IDR
PKT

610

METHODS AND APPARATUS FOR GENERATING A LIVE STREAM FOR A CONNECTED DEVICE

PRIORITY

This application claims the benefit of priority to co-owned U.S. Provisional Patent Application Ser. No. 63/500,234 entitled "METHODS AND APPARATUS FOR GENERATING A LIVE STREAM FOR A CONNECTED DEVICE", filed May 4, 2023, incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of digital image capture and post-processing in a mobile ecosystem. More particularly, the present disclosure relates to systems, computer programs, devices, and methods for generating a live stream for a connected device.

DESCRIPTION OF RELATED TECHNOLOGY

Action cameras are a relatively recent phenomenon. Unlike studio photography which can be carefully composed and controlled, action cameras are typically designed to capture footage while on-the-move. For a variety of reasons, action cameras are typically compact, ruggedized, and designed to require minimal interaction once recording has begun. In most situations, the action camera user cannot control shooting conditions; interesting moments fleetingly occur and often cannot be replicated. While "post-processing" (i.e., after capture) allows user to trim, re-frame, and/or slow down footage to focus on interesting moments, etc., the user often wants to know that they "got the shot" at the time of capture. One proposed feedback scheme is to live stream the captured footage to a nearby mobile device for review.

As an important tangent, the action camera may need to interface with smart phones, laptops and/or smart watches of unknown capability. Significant differences in processors, memories, modems, and/or codecs may introduce performance bottlenecks. While an action camera could reduce its encoded output to provide playable live stream for another device, this would also reduce the media quality that is available for post-processing.

In view of the foregoing, novel solutions for live streaming via the mobile ecosystem are needed.

BRIEF DESCRIPTION OF THE DRAWINGS

FIG. 2 is a graphical representation of in-camera stabilization and its limitations, useful in explaining various aspects of the present disclosure.

DETAILED DESCRIPTION

Figure 1:
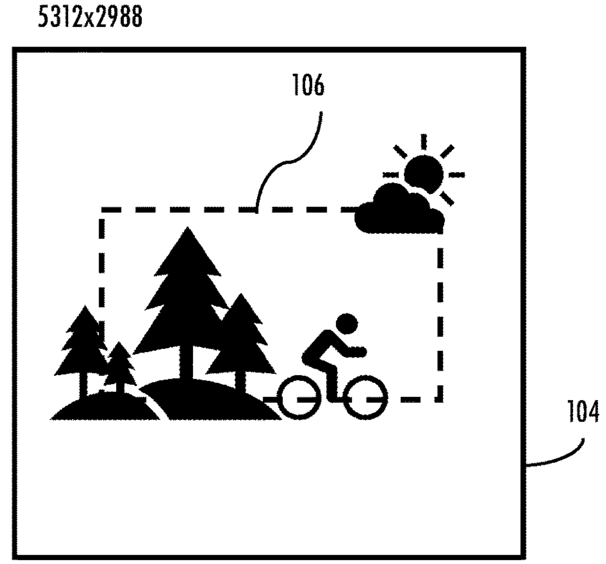
FIG. 1 is a graphical representation of Electronic Image Stabilization (EIS) techniques, useful in explaining various aspects of the present disclosure.
Figure 1:
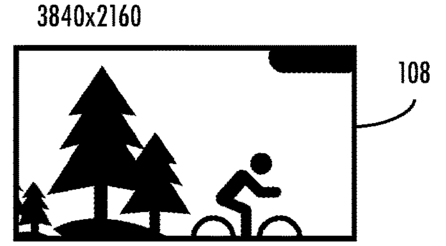

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Action Camera Photography and Real-Time Budgets

Unlike most digital photography, action photography is captured under difficult conditions which are often out of the photographer's control. In many cases, shooting occurs in outdoor settings where there are very large differences in lighting (e.g., over-lit, well-lit, shaded, etc.) Additionally, the photographer may not control when/where the subject of interest appears; and taking time to re-shoot may not be an option. Since action cameras are also ruggedized and compact, the user interface (UI/UX) may also be limited. Consider an example of a mountain biker with an action camera mounted to their handlebars, recording a trip through a wilderness canyon. The mountain biker has only very limited ability to control the action camera mid-action. Interesting footage may only be fleeting moments in the periphery of capture. For instance, the mountain biker may not have the time (or ability) to point the camera at a startled deer bolting off trail. Nonetheless, the action camera's wide field-of-view allows the mountain biker to capture subject matter at the periphery of the footage, e.g., in this illustrative example, the footage can be virtually re-framed on the deer, rather than the bike path.

As a related complication, action cameras are often used while in-motion. Notably, the relative motion between the camera's motion and the subject motion can create the perception of apparent motion when the footage is subsequently viewed in a stable frame-of-reference. A variety of different stabilization techniques exist to remove undesirable camera motion. For example, so-called electronic image stabilization (EIS) relies on image manipulation techniques to compensate for camera motion.

As used herein, a "captured view" refers to the total image data that is available for electronic image stabilization (EIS) manipulation. A "designated view" of an image is the visual portion of the image that may be presented on a display and/or used to generate frames of video content. EIS algorithms generate a designated view to create the illusion of stability; the designated view corresponds to a "stabilized" portion of the captured view. In some cases, the designated view may also be referred to as a "cut-out" of the image, a "cropped portion" of the image, or a "punch-out" of the image.

FIG. 1 depicts a large image capture 100 (e.g., 5312×2988 pixels) that may be used to generate a stabilized 4K output video frame 102 (e.g., 3840×2160 pixels) at 120 frames per second (FPS). The EIS algorithm may select any contiguous 3840×2160 pixels and may rotate and translate the output video frame 102 within the large image capture 100. For example, a camera may capture all of scene 104 but only use the narrower field of view of scene 106. After in-camera stabilization, the output frame 108 can be grouped with other frames and encoded into video for transport off-camera. Since video codecs compress similar frames of video using motion estimation between frames, stabilized video results in much better compression (e.g., smaller file sizes, less quantization error, etc.)

Notably, the difference between the designated view and the captured field of view defines a "stabilization margin." The designated view may freely pull image data from the stabilization margin. For example, a designated view may be rotated and/or translated with respect to the originally captured view (within the bounds of the stabilization margin). In certain embodiments, the captured view (and likewise the stabilization margin) may change between frames of a video. Digitally zooming (proportionate shrinking or stretching of image content), warping (disproportionate shrinking or stretching of image content), and/or other image content manipulations may also be used to maintain a desired perspective or subject of interest, etc.

As a practical matter, EIS techniques must trade-off between stabilization and wasted data, e.g., the amount of movement that can be stabilized is a function of the amount of cropping that can be performed. Un-stable footage may result in a smaller designated view whereas stable footage may allow for a larger designated view. For example, EIS may determine a size of the designated view (or a maximum viewable size) based on motion estimates and/or predicted trajectories over a capture duration, and then selectively crop the corresponding designated views.

Figure 2:
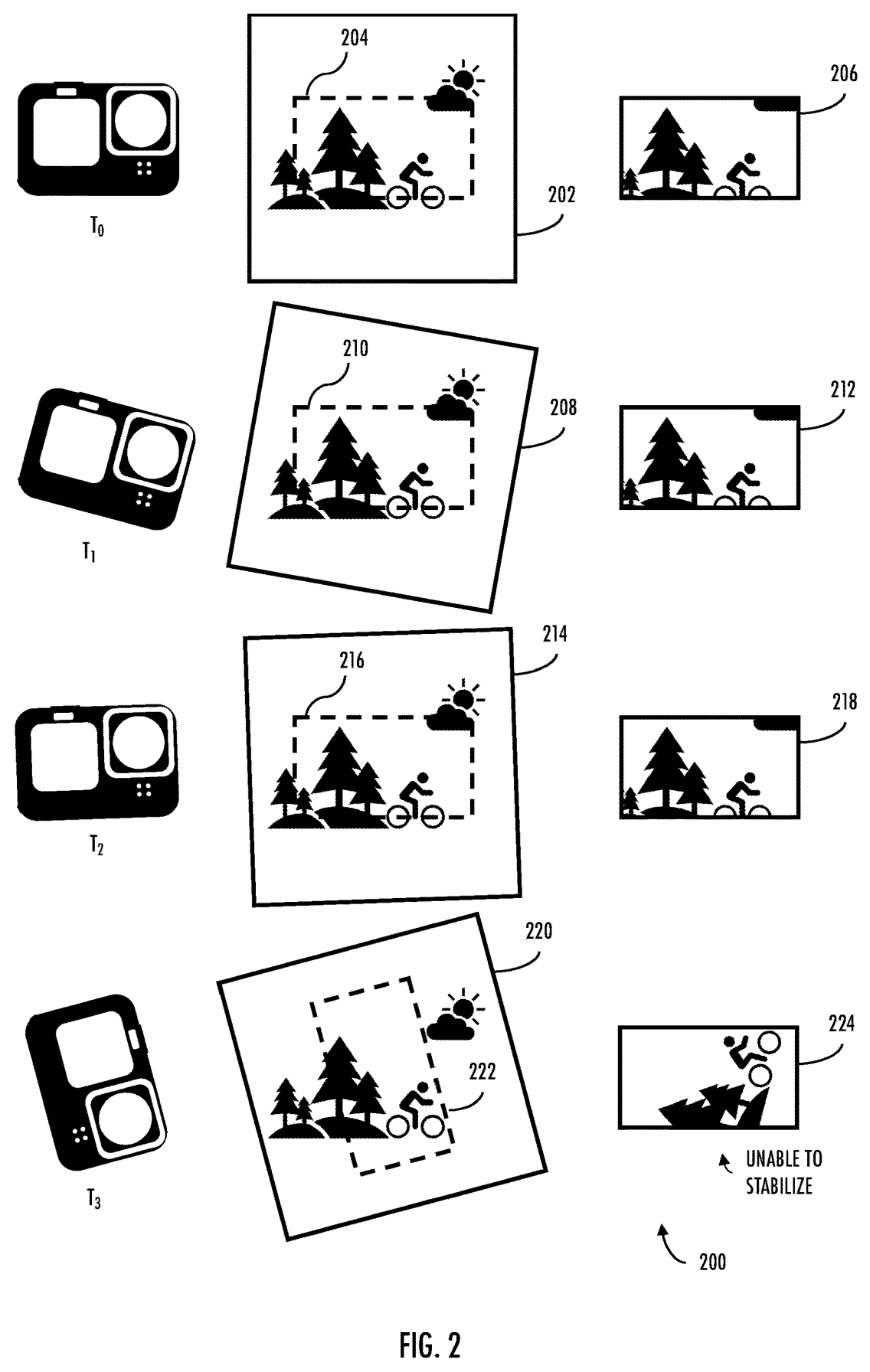

Unfortunately, "in-camera" stabilization is limited by the camera's onboard resources e.g., the real-time budget of the camera, processing bandwidth, memory buffer space, and battery capacity. Additionally, the camera can only predict future camera movement based on previous movement, etc. To illustrate the effects of in-camera stabilization limitations, FIG. 2 depicts one exemplary in-camera stabilization scenario 200.

At time $T_0$, the camera sensor captures frame 202 and the camera selects capture area 204 for creating stabilized video. Frame 206 is output from the capture; the rest of the captured sensor data may be discarded.

At times $T_1$ and $T_2$, the camera shifts position due to camera shake or motion (e.g., motion of the camera operator). The positional shift may be in any direction including movements about a lateral axis, a longitudinal axis, a vertical axis, or a combination of two or more axes. Shifting may also twist or oscillate about one or more of the forgoing axes. Such twisting about the lateral axis is called pitch, about the longitudinal axis is called roll, and about the vertical axis is called yaw.

As before, the camera sensor captures frames 208, 214 and selects capture areas 210, 216 to maintain a smooth transition. Frames 212, 218 are output from the capture; the rest of the captured sensor data may be discarded (or stored for later post-processing).

At time $T_3$, the camera captures frame 220. Unfortunately, however, the camera cannot find a suitable stable frame due to the amount of movement and the limited resource budget for real-time execution of in-camera stabilization. The camera selects capture area 222 as a best guess to maintain a smooth transition (or alternatively turns EIS off). Incorrectly stabilized frame 224 is output from the capture and the rest of the captured sensor data may be discarded (or stored for later post-processing).

In a related tangent, images captured with sensors that use an Electronic Rolling Shutter (ERS) can also introduce undesirable rolling shutter artifacts where there is significant movement in either the camera or the subject. ERS exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time but they are not erased/read at the same time since the pointers scan through the rows. This slight temporal shift between the start of each row may result in a deformed image if the image capture device (or subject) moves.

ERS compensation may be performed to correct for rolling shutter artifacts from camera motion. In one specific implementation, the capture device determines the changes in orientation of the sensor at the pixel acquisition time to correct the input image deformities associated with the motion of the image capture device. Specifically, the changes in orientation between different captured pixels can be compensated by warping, shifting, shrinking, stretching, etc. the captured pixels to compensate for the camera's motion.

Video Compression and Instantaneous Decoder Refresh Frames

Video compression is used to encode frames of video at a frame rate for playback. Most compression techniques divide each frame of video into smaller pieces (e.g., blocks, macroblocks, chunks, or similar pixel arrangements.) Similar pieces are identified in time and space and compressed into their difference information. Subsequent decoding can recover the original piece and reconstruct the similar pieces using the difference information. For example, in MPEG-based encoding, a frame of video (e.g., 3840×2160 pixels) may be subdivided into macroblocks; each macroblock includes a 16×16 block of luminance information and two 8×8 blocks of chrominance information. For any given macroblock, similar macroblocks are identified in the current, previous, or subsequent frames and encoded relative to the macroblock. Intra-frame similarity refers to macroblocks which are similar within the same frame of video. Inter-frame similarity refers to macroblocks which are similar within different frames of video.

Figure 3:
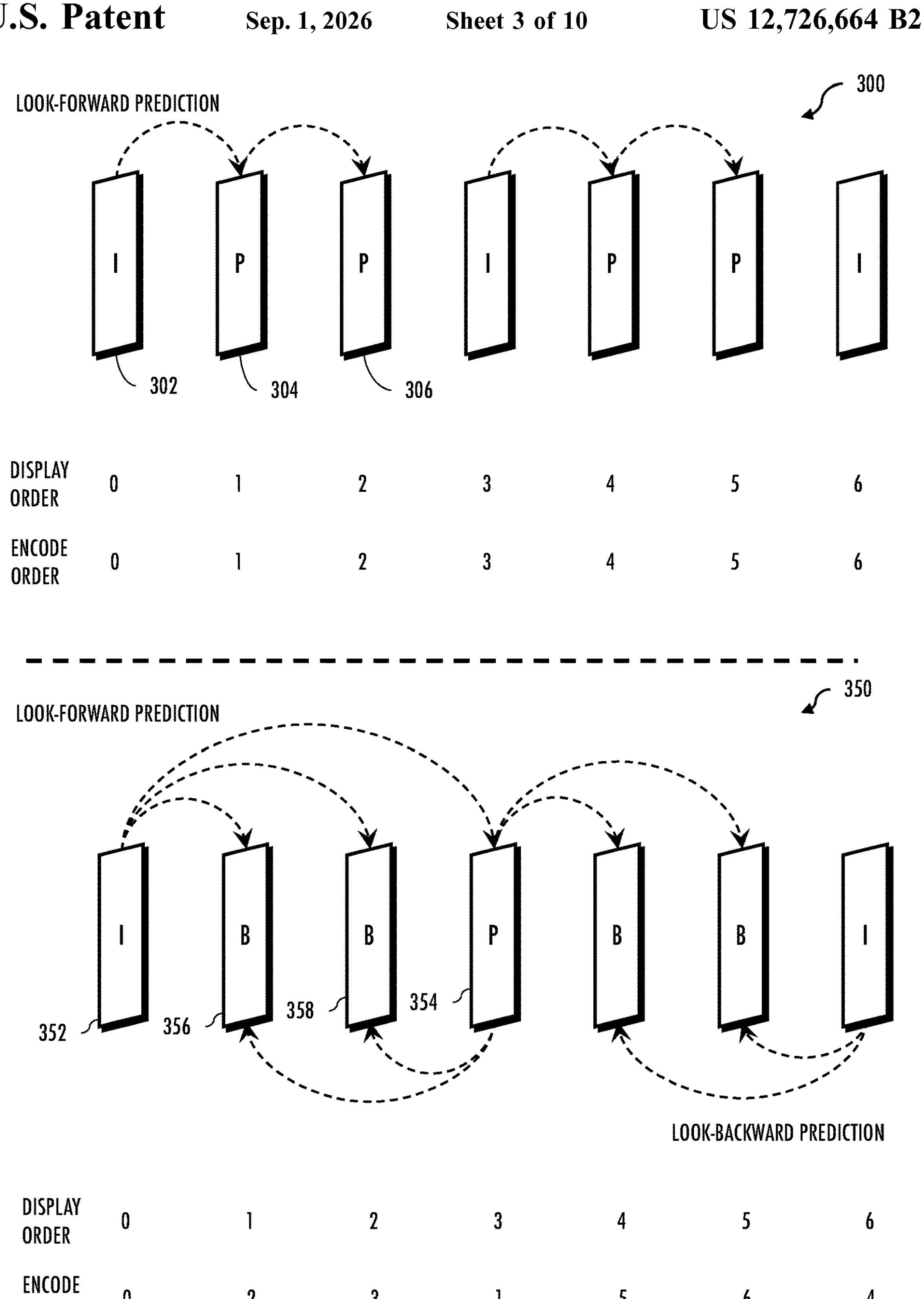
FIG. 3 is a graphical representation of video compression techniques, useful in explaining various aspects of the present disclosure.

FIG. 3 is a graphical representation of video compression techniques, useful in explaining various aspects of the present disclosure. As shown in video compression scheme 300, frames 0-6 of video may be represented with intra-frames (I-frames) and predicted frames (P-frames).

I-frames are compressed with only intra-frame similarity. Every macroblock in an I-frame only refers to other macroblocks within the same frame. In other words, an I-frame can only use "spatial redundancies" in the frame for compression. Spatial redundancy refers to similarities between the pixels of a single frame.

P-frames allow macroblocks to be compressed using temporal prediction in addition to spatial prediction. For motion estimation, P-frames use frames that have been previously encoded e.g., P-frame 304 is a "look-forward" from I-frame 302, and P-frame 306 is a "look-forward" from P-frame 304. Every macroblock in a P-frame can be temporally predicted, spatially predicted, or "skipped" (i.e., the co-located block has a zero-magnitude motion vector). Images often retain much of their pixel information between different frames, so P-frames are generally much smaller than I-frames but can be reconstructed into a full frame of video.

As a brief aside, compression may be lossy or lossless. "Lossy" compression permanently removes data, "lossless" compression preserves the original digital data fidelity. Preserving all the difference information between I-frames to P-frames results in lossless compression, usually however, some amount of difference information can be discarded to improve compression efficiency with very little perceptible impact. Unfortunately, lossy differences (e.g., quantization error) that have accumulated across many consecutive P-frames and/or other data corruptions (e.g., packet loss, etc.) might impact subsequent frames. As a practical matter, I-frames do not reference any other frames and may be inserted to "refresh" the video quality or recover from catastrophic failures. In other words, codecs are typically tuned to favor I-frames in terms of size and quality because they play a critical role in maintaining video quality. Ideally, the frequency of I-frames and P-frames is selected to balance accumulated errors and compression efficiency. For example, in video compression scheme 300, each I-frame is followed by two P-frames. Slower moving video has smaller motion vectors between frames and may use larger numbers of P-frames to improve compression efficiency. Conversely, faster moving video may need more I-frames to minimize accumulated errors.

More complex video compression techniques can use look-forward and look-backward functionality to further improve compression performance. Referring now to video compression scheme 350, frames 0-6 of video may be represented with intra-frames (I-frames), predicted frames (P-frames), and bi-directional frames (B-frames). Much like P-frames, B-frames use temporal similarity for compression-however, B-frames can use backward prediction (a look-backward) to compress similarities for frames that occur in the future, and forward prediction (a look-ahead) to compress similarities from frames that occurred in the past. In this case, B-frames 356, 358 each use look-forward information from I-frame 352 and look-backward information from P-frame 354. B-frames can be incredibly efficient for compression (more so than even P-frames).

In addition to compressing redundant information, B-frames also enable interpolation across frames. While P-frames may accumulate quantization errors relative to their associated I-frame, B-frames are anchored between I-frames, P-frames, and in some rare cases, other B-frames (collectively referred to as "anchor frames"). Typically, the quantization error for each B-frame will be less than the quantization error between its anchor frames. For example, in video compression scheme 350, P-frame 354 may have some amount of quantization error from the initial I-frame 352; the B-frames 356, 358 can use interpolation such that their quantization errors are less than the P-frame's error.

As used throughout, a "group of pictures" (GOP) refers to a multiple frame structure composed of a starting I-frame and its subsequent P-frames and B-frames. A GOP may be characterized by its distance between anchor frames (M) and its total frame count (N). In FIG. 3, video compression scheme 300 may be described as M=1, N=3; video compression scheme 350 may be described as M=3, N=7.

Bi-directional coding uses many more resources compared to unidirectional coding. Resource utilization can be demonstrated by comparing display order and encode/decode order. As shown in FIG. 3, video compression scheme 300 is unidirectional because only "look-forward" prediction is used to generate P-frames. In this scenario, every frame will either refer to itself (I-frame) or to a previous frame (P-frame). Thus, the frames can enter and exit the encoder/decoder in the same order. In contrast, video compression scheme 350 is bi-directional and must store a large buffer of frames. For example, the encoder must store and re-order I-frame 352 before P-frame 354; both B-frame 356 and B-frame 358 will each separately refer to I-frame 352 and P-frame 354. While this example depicts encoding, analogous re-ordering must occur at the decoder. In other words, the codecs must maintain two separate "orders" or "queues" in their memory-one queue for display, and another queue for encoding/decoding. Due to the re-ordering requirements, bi-directional coding greatly affects the memory usage and latency of codecs.

While the present discussion is described in the context of "frames", artisans of ordinary skill in the related arts will readily appreciate that the techniques described throughout may be generalized to any spatial and/or temporal subdivision of media data. For example, the H.264/MPEG-4 AVC video coding standard (*Advanced Video Coding for Generic Audiovisual Services*, published August 2021, and incorporated herein by reference in its entirety), provides prediction within "slices" of a frame. A slice is a spatially distinct region of a frame that is encoded separately from other regions of the same frame. I-slices only use macroblocks with intra-prediction, P-slices can use macroblocks with intra- or inter-prediction. So-called "switching P-slices" (SP-slices) are like P-slices and "switching I-slices" (SI-slices) are similar to I-slices, however corrupted SP-slices can be replaced with SI-slices—this enables random access and error recovery functionality at slice granularity.

An "instantaneous decoder refresh" (IDR) frame is a special type of I-frame that specifies that no frame after the IDR frame can reference any previous frame. During operation, an encoder can send an IDR coded picture to clear the contents of the reference picture buffer. On receiving an IDR coded picture, the decoder marks all pictures in the reference buffer as "unused for reference." In other words, any subsequently transmitted frames can be decoded without reference to frames prior to the IDR frame. Notably, IDR frames can only contain I-slices or SI-slices.

Live Streaming within a Mobile Ecosystem

One proposed user feedback mechanism uses the action camera to wirelessly "live stream" its capture feed (at the time of capture, under near real-time constraints) to a nearby smart phone. This allows the user to intuitively position the camera and adjust their capture settings, etc. to make sure that they "catch the shot". Later, at home, the user may transfer the stored video to their home laptop for post-processing via a removeable memory card (e.g., under best effort constraints). Unfortunately, differences between post-processing devices may have different capabilities and/or abilities which can introduce undesirable behaviors.

Figure 4:
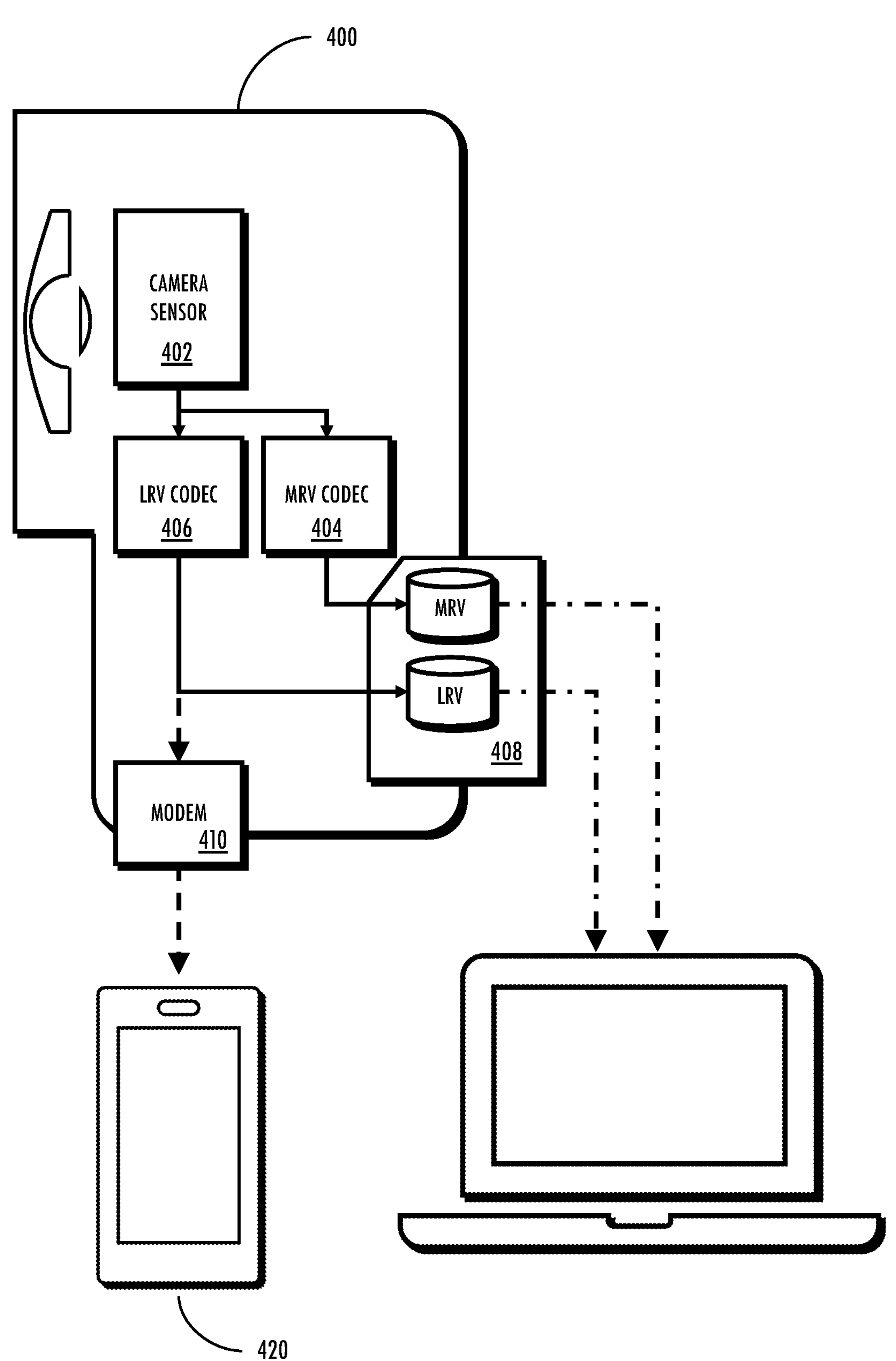
FIG. 4 is a graphical representation of a main resolution video (MRV) pipeline and a low-resolution video (LRV) pipeline, useful in explaining various aspects of the present disclosure.

Consider the scenario depicted in FIG. 4, where an action camera 400 captures a plurality of images via a camera sensor 402. The images are encoded by a main resolution video codec (MRV codec 404) based on the user's desired capture parameters. For example, a user may select among different aspect ratios and frame rates (e.g., 5.3K (5312×2988 pixels) at 60 FPS, 4K (3840×2160 pixels) at 120 FPS, 2.7K (2704×1520 pixels) at 240 FPS, etc.). Other commonly used capture settings may include e.g., bit rate, group of pictures (GOP) structure, frames per second, resolution, etc. The MRV codec 404 stores the video as a MRV data structure within the removeable memory card 408 (e.g., an SD card, etc.) In this example, the user prioritizes the highest available frame rate (2.7K@240 FPS) and intends to slow-down the capture in post-processing (e.g., adding a so-called "slow-mo" effect).

As discussed above, video processing complexity is proportionally related to the dimensions of the video frames, the duration of the video, and the look-ahead/look-backward window. Processing the MRV data structure may be too computationally complex and slow to enable user interface interactions. Thus, the images may be concurrently encoded (in parallel) with a low-resolution video codec (LRV codec 406). The resulting LRV data structure allows a post-processing device to work with a lower resolution version of their captured data to e.g., check shot placement, crop/rotate, and/or otherwise edit their footage. The difference in sizes between MRV and LRV files can be quite substantial—1 minute of MRV data captured at 4K (3840×2160 pixels) and 120 FPS can exceed 1.8 GB; in contrast, the LRV data may only use a half, fourth, or even smaller resolution (e.g., 1920×1080 pixels, 960×540 pixels, etc.) resulting in file sizes that are only a fraction of the MRV (e.g., a quarter, a sixteenth, etc.).

Figure 5:
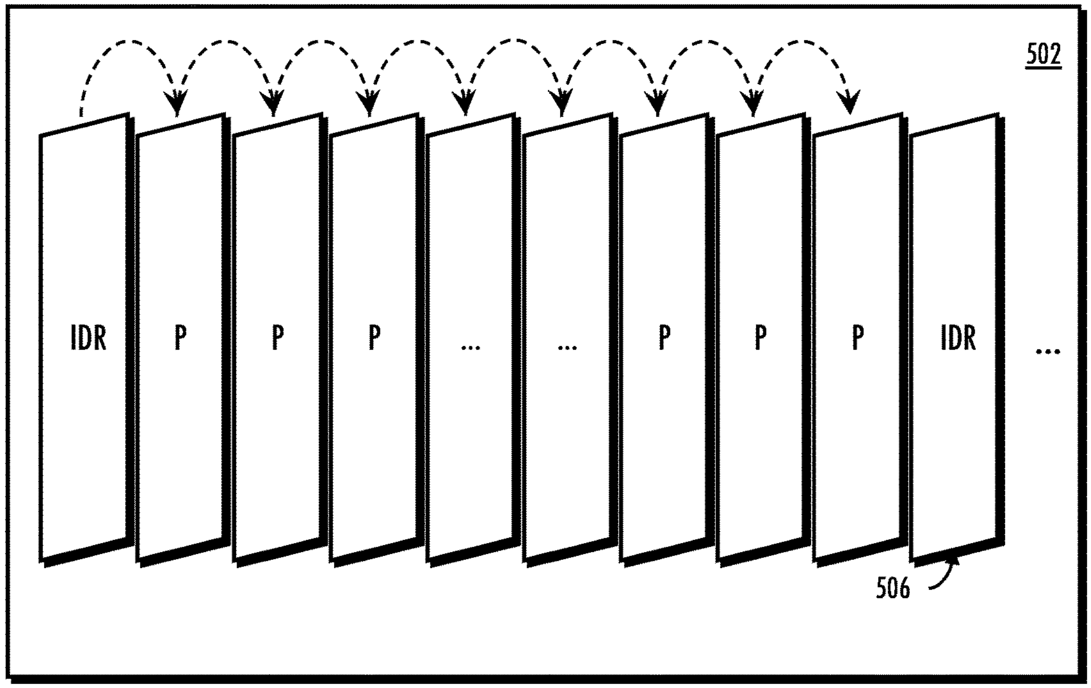
FIG. 5 is a graphical representation of a main resolution video (MRV) data structure and a low-resolution video (LRV) data structure, useful in explaining various aspects of the present disclosure.
Figure 5:
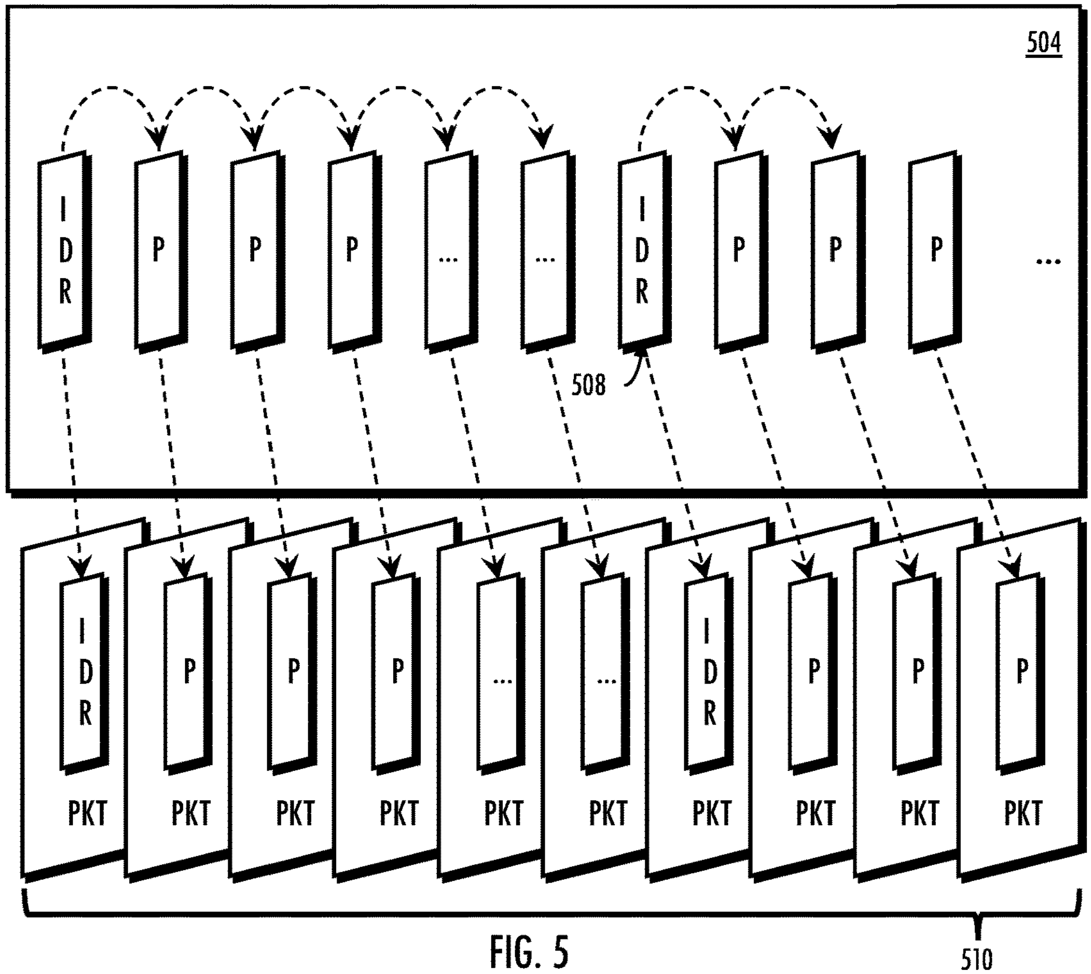

While the LRV codec 406 has a smaller image resolution relative to the MRV codec 404, certain other parameters must match for post-processing. As shown in FIG. 5, the MRV data structure 502 and the LRV data structure 504 must be synchronized and share a common time reference (e.g., frame rate and frame timing)—this ensures that post-processing edits to the LRV data structure 504 can be directly translated to the MRV data structure 502. In the illustrated example of FIG. 5, the MRV codec 404 and the LRV codec 406 share a common clock, thus the time reference does not appreciably drift between the two codecs. The shared clock also allows the LRV codec 406 to match its frame rate (240 FPS) to the MRV codec 404 (240 FPS). However, since the MRV codec 404 and the LRV codec 406 are two distinct codecs operating at two different resolutions, they may not be aligned in other respects—for example, in this example, the GOP structure is independently determined by each codec, resulting in mis-aligned MRV IDR frame 506 and LRV IDR frame 508.

To live stream the LRV data structure, the action camera 400 further segments the LRV data and encapsulates the segments into packets 510 for wireless transmission via a modem 410. In this example, each LRV frame is packetized separately (e.g., 240 frames/second corresponds to 240 packets/second); other implementations may packetize multiple frames together or divide a frame across multiple packets. The packets are transmitted to a smart phone 420 as a live stream.

As a brief aside, displays have historically used "refresh rate" to specify how many times a screen's static image changes (or how many frames it shows) each second, measured in Hertz (Hz). A display with a refresh rate of 60 Hz shows 60 frames per second (fps), while 120 Hz and 240 Hz screens refresh at a rate of 120 fps and 240 fps, respectively. Most smart phones use commodity display components that support display refresh rates of 60 Hz, 90 Hz, 120 Hz; higher refresh rates (e.g., 144 Hz, 240 Hz, etc.) are much less common and typically only found on high-end phones/gaming consoles. In other words, most smart phones do not have a display capability that can keep up with the action camera's fastest frame rates.

Similarly, commodity codecs are often designed to handle the most common applications (computer monitors, movies, etc.), and these specifications generally identify particular "native" aspect ratios and frame rates (e.g., 4096×2160 pixels at 60 FPS, etc.). While codecs may support both software emulation and dedicated hardware circuits, the relative performance is markedly different. Hardware acceleration is based on physical logic and sequential components; thus, hardware circuits have hard limitations on the amount of data that they can process (e.g., throughput) and the dimensions of data they can handle (e.g., row and/or column buffer sizes). In contrast, software-based codec operation logically emulates hardware with arithmetic operations which consumes processing resources and is much slower (e.g., 50×). Software based coding may be useful where the A/V media is of unusual size/frame rate or has non-standardized features. More directly, smart phones with commodity codecs may only implement hardware acceleration for commonly used resolutions but rely on software emulation for atypical resolutions (which may include the LRV resolutions).

More generally, real-time and near real-time processing often imposes significant constraints on multiple different system components. Here, the smart phone 420 must use near real-time scheduling to receive a live stream from the action camera 400 via its modem, decode the live stream, and display the resulting video. However, the smart phone's commodity components (e.g., processors, memories, modems, codecs, and/or display components) may have many unknown constraints, any one of which could bottleneck the smart phone's ability to receive the live stream. Anecdotal evidence suggests that most commodity smart phones suffer from glitchy/undesirable behaviors when attempting to live stream the LRV video output.

As used herein, the term "commodity" refers to a good, service, etc. that is fungible (interchangeable) with other goods/services of the same market segment. Commodity goods and services compete based on price, rather than brand recognition, functionality, power consumption, performance, or other differentiable features. For example, commodity codecs provide a stable ratio of price to e.g., performance, power consumption, etc. As but one illustrative example, the market segment for Level 5.1 HEVC codecs has matured such that any Level 5.1 HEVC codec may be substituted for another without substantial impact on a manufacturer's bill-of-material (BOM) pricing because the price per performance ($pixel^2$/sec) does not substantially vary. In contrast, the market for Level 6.0 HEVC codecs is not yet mature; thus, Level 6.0 HEVC codecs are markedly more expensive in terms of price per performance compared to Level 5.1 HEVC codecs. In fact, the difference in BOM cost is so high, that two Level 5.1 HEVC commodity codecs are cheaper than a single Level 6.0 HEVC codec.

Example Operation: "Picking" a Live Stream from an Existing Stream

Figure 6:
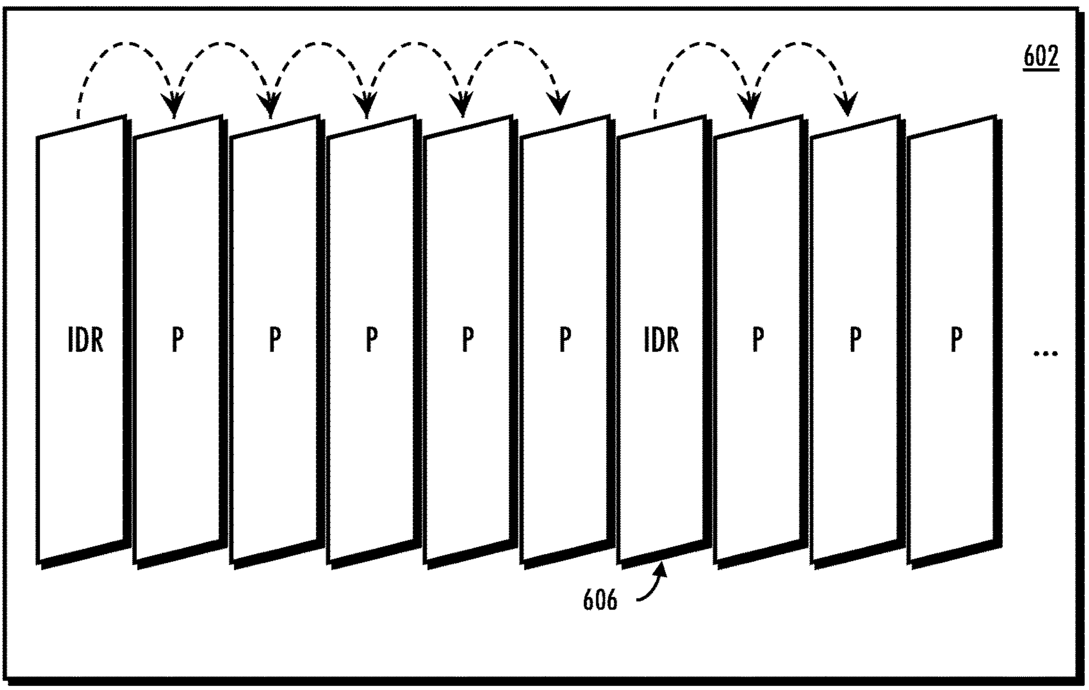
FIG. 6 is a graphical representation of a first encoded data structure and a concurrently encoded second encoded data structure, in accordance with the various aspects of the present disclosure.
Figure 6:
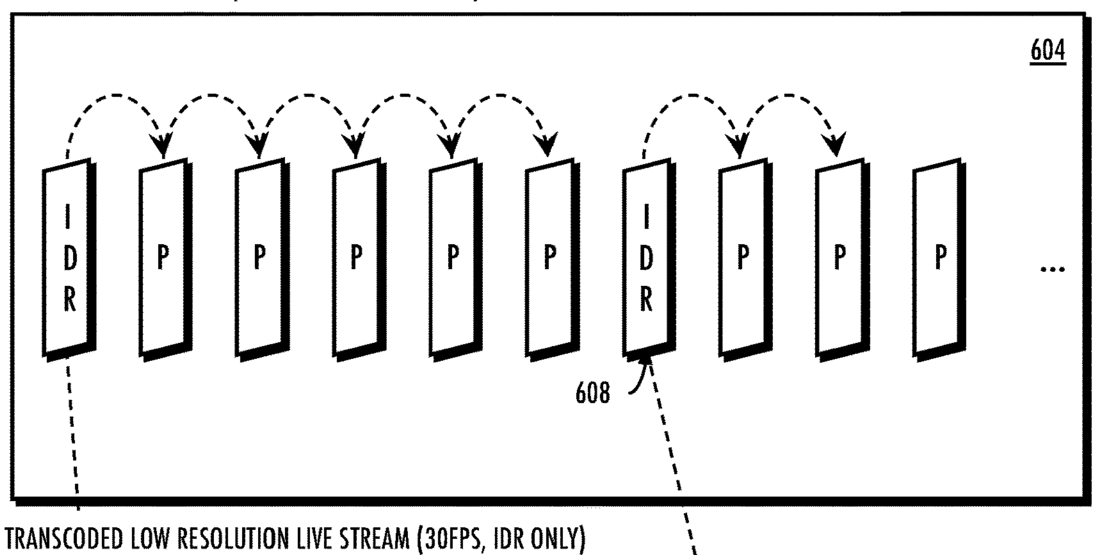

FIG. 6 is a graphical representation of a first encoded data structure and a concurrently encoded second encoded data structure, in accordance with an exemplary embodiment of the present disclosure. As shown, a main resolution video (MRV) data structure 602 and a low-resolution video (LRV) data structure 604 are synchronized and share a common time reference (e.g., frame rate and frame timing)—this ensures that post-processing edits to the LRV data structure 604 can be directly translated to the MRV data structure 602. In addition, rather than allowing each encoder to independently determine their frame rate, the MRV encoder and LRV encoder are constrained to a shared frame rate. Furthermore, the frame rate is set based on a known (or assumed) connected device capability. For example, if the captured image data is captured at 240 FPS and the connected device has an assumed refresh rate of 30 Hz, then the frame rate is set with one IDR frame for every 8 frames (M=1, N=8), regardless of whether e.g., the content of the video could be more efficiently compressed with more P-frames/slices, etc.

As shown in FIG. 6, the resulting MRV data structure 602 and LRV data structure 604 remain time aligned. Furthermore, the LRV data structure 604 can be compressed to a much smaller live stream by picking only the IDR frames for delivery in a transport stream. In other words, only the IDR frames of the LRV data structure 604 can be parsed and encapsulated into packets 610 for transmission to a connected device. Notably, the live stream directly maps to IDR frames of the LRV and MRV (i.e., the live stream IDR frame 612 corresponds to LRV IDR frame 608, which also corresponds to MRV IDR frame 606). More directly, the user can check that they "caught the shot" via the live stream which has a direct correspondence to the MRV and LRV data structures used during post-processing.

While the foregoing example is presented in the context of an IDR-only live stream, artisans of ordinary skill in the related arts given the contents of the present disclosure will readily appreciate that other implementations may packetize I-frames/slices, P-frames/slices, and/or B-frames/slices. For example, a 240 FPS LRV data structure with a M=1, N=8 GOP data structure may be selectively parsed ("picked") to a 30 FPS IDR-only version by picking only the IDR frames for transport, a 60 FPS version by picking 1 IDR frame and 1 P-frame, a 120 FPS version by picking 1 IDR frame and 3 P-frames, etc. Moreover, the "picking" process may occur in whole or part, at either or both of, the action camera and the smart phone. For example, the picking may occur at the action camera prior to packetization, this ensures that only the minimum number of packets need to be live streamed. In other implementations, the picking may occur at the smart phone; e.g., the smart phone receives all the packets, but drops any packets that it cannot render. This may be particularly useful where the smart phone has sufficient modem bandwidth but is concurrently busy with another task and may or may not need the additional packets (e.g., best effort post-processing).

Additionally, while the foregoing example is illustrated in the context of a static frame rate based on capabilities of the connected device, the techniques may be extended to dynamic frame rates based on feedback from the connected device. In some variants, the connected device may explicitly provide its actual capabilities to the action camera. For example, the connected device may advertise its parameters as part of the discovery, pairing, and/or configuration process. In another such example, the connected device may notify the action camera that the current live stream falls below/exceeds its capabilities. Responsively, the action camera may throttle up/down its bitstream characteristics by changing its IDR interval and/or frame rate. In either scenario, the action camera adjusts its bitstream characteristics according to "known" connected device capabilities. In some cases, however, the action camera does not have any information regarding the connected device capabilities; in these scenarios, the action cameras may "assume" a default capability and set its bitstream characteristics accordingly. For example, in such cases, the action camera may set its output frame rate to e.g., 30 FPS (e.g., NTSC (National Television System Committee) in the US), 25 FPS (e.g., PAL (Phase Alternate Line) commonly used in Europe), etc. Other illustrative IDR intervals are provided below in Table 1.

TABLE 1

Exemplary IDR-only Data Structures

| Format | Capture FPS | IDR Interval | Streaming FPS |
|---|---|---|---|
| NTSC | 240 | 8 | 30 |
| NTSC | 120 | 4 | 30 |
| NTSC | 60 | 2 | 30 |
| PAL | 200 | 8 | 25 |
| PAL | 100 | 4 | 25 |
| PAL | 50 | 2 | 25 |

More generally, various embodiments of the present disclosure configure the bitstream characteristics of the processing pipeline for the LRV to provide a matching frame rate to the processing pipeline for the MRV. This frame rate correspondence ensures that MRV post-processing can leverage LRV edits, and that the LRV stream may be quickly converted to an IDR-only stream for use with limited capability devices. In other words, streaming can be performed at a much lower frame rate by picking only the IDR frames that are independently decodable.

Exemplary Mobile Ecosystem Architecture

System Architecture

Figure 7:
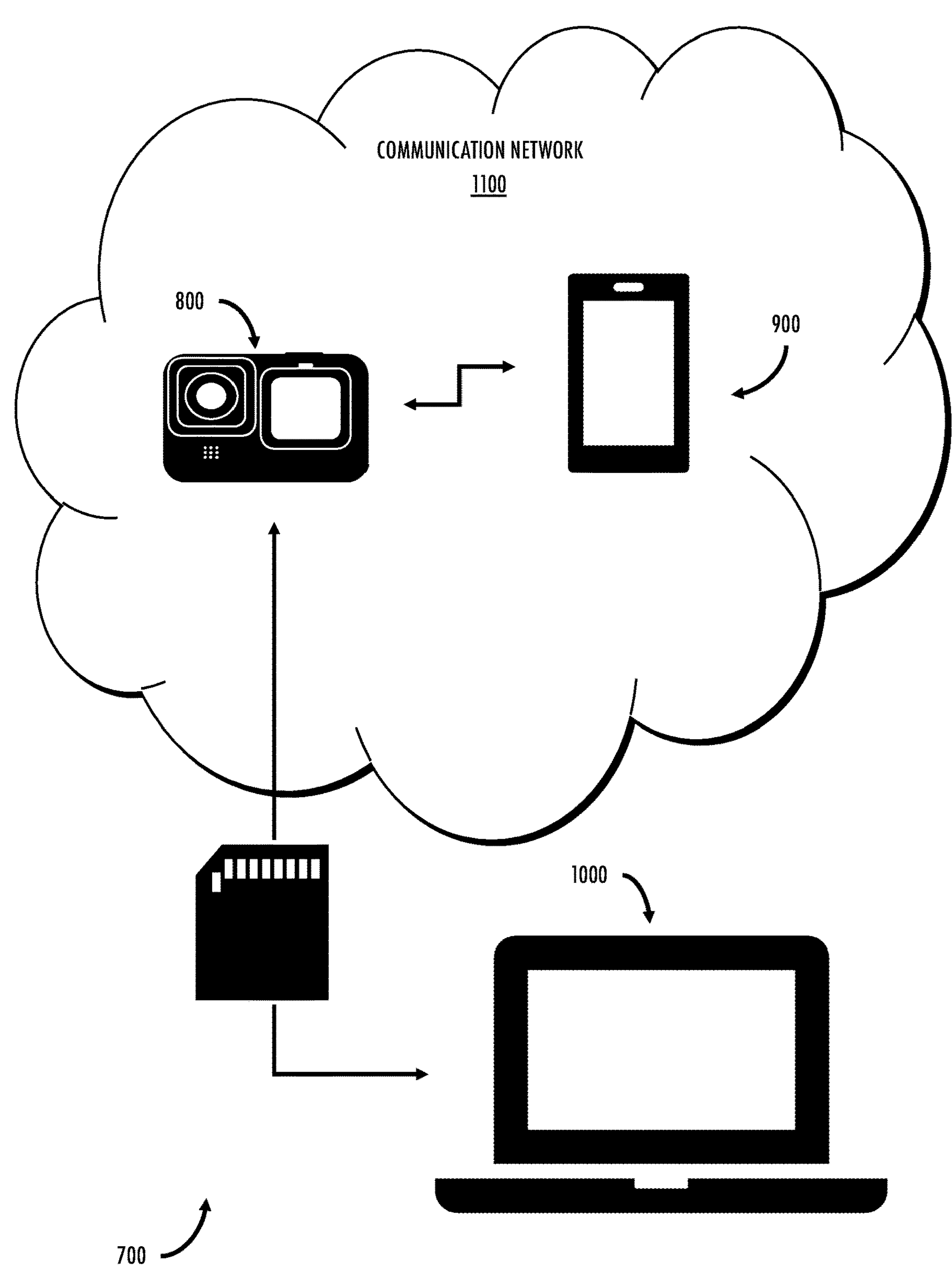
FIG. 7 is a logical block diagram of the exemplary system architecture, in accordance with various aspects of the present disclosure.

FIG. 7 is a logical block diagram of the exemplary system 700 that includes: a capture device 800, a connected device 900, a post-processing device 1000, and a communication network 1100. During a capture sequence, the capture device 800 captures media and streams the media to the connected device 900 via the communication network 1000. The connected device 900 may control aspects of the capture device 800 operation (e.g., bit rate, resolution, frame rate, group of pictures (GOP) structure, etc.) After capture, the capture device 800 can provide the captured media to the post-processing device 1000 to playback, edit, and/or publish the media. While the examples are presented in the context of a three-party transaction, the techniques may be readily extended to any number of devices. For example, the connected device 900 could both control the operation of the capture device 800 during capture (in real-time or near real-time), and post-process the captured media later (at best effort).

The following discussion provides functional descriptions for each of the logical entities of the exemplary system 700. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 700 is separately provided below.

Functional Overview of the Capture Device

Functionally, a capture device 800 generates captured media for live streaming to a connected device 900. In one embodiment, an action camera encodes a first video data structure (a main resolution video (MRV) stream) and a second video data structure (a low-resolution video (LRV)). Additionally, the second video data structure is selectively parsed to create a transport stream for live streaming. In one exemplary embodiment, the encoding characteristics ("bitstream characteristics") of at least the second video data structure may additionally be modified to accommodate the capabilities of a connected device (whether known or assumed). For example, the LRV encoding may be constrained to include IDR frames at a default resolution and/or frame rate. Subsequent feedback from the connected device may be used to dynamically adjust the selectively parsed transport stream. More generally however, the techniques could broadly apply to any device that would benefit from concurrently encoding media and/or live streaming the media, such that a timing/frame alignment between the stored and/or streamed versions is preserved.

As used herein, the term "live streaming" and its linguistic derivatives refer to techniques that deliver portions of media for playback in real-time or near real-time.

As used herein, the term "transport", "transport stream" and their linguistic derivatives refer to digital data container formats for transmission and storage of audio, video, and program system information protocol (PSIP) data. Transport streams are commonly used in broadcast systems such as DVB, ATSC, and IPTV.

As used herein, the term "real-time" refers to tasks that must be performed within definitive constraints; for example, a video camera must capture each frame of video at a specific rate of capture (e.g., 240 frames per second (fps)). As used herein, the term "near real-time" refers to tasks that must be performed within definitive time constraints once started. For example, a smart phone may use near real-time rendering for each frame of video at its specific rate of display, however some queueing time may be allotted prior to display (e.g., a "glass-to-glass" latency of ~1 second).

Unlike real-time and near real-time tasks, so-called "best effort" refers to tasks that can be handled with variable bit rates and/or latency. Best effort tasks are generally not time sensitive and can be run as low-priority background tasks (for even very high complexity tasks), batched/queued, etc.

The techniques described throughout may be broadly applicable to any capture devices such as cellular phones, laptops, smart watches, and/or IoT devices. For example, cameras on smart phones are often able to capture much higher resolutions than their displays can render; in such cases, a smart phone may internally selectively parse an encoded transport stream to a reduced IDR-only frame rate version, etc. Similarly, a laptop may be able to e.g., encode/decode media for itself while also live streaming to a less capable device (e.g., a smart phone). Various other applications may be substitute with equal success by artisans of ordinary skill in the related arts, given the contents of the present disclosure.

Figure 8:
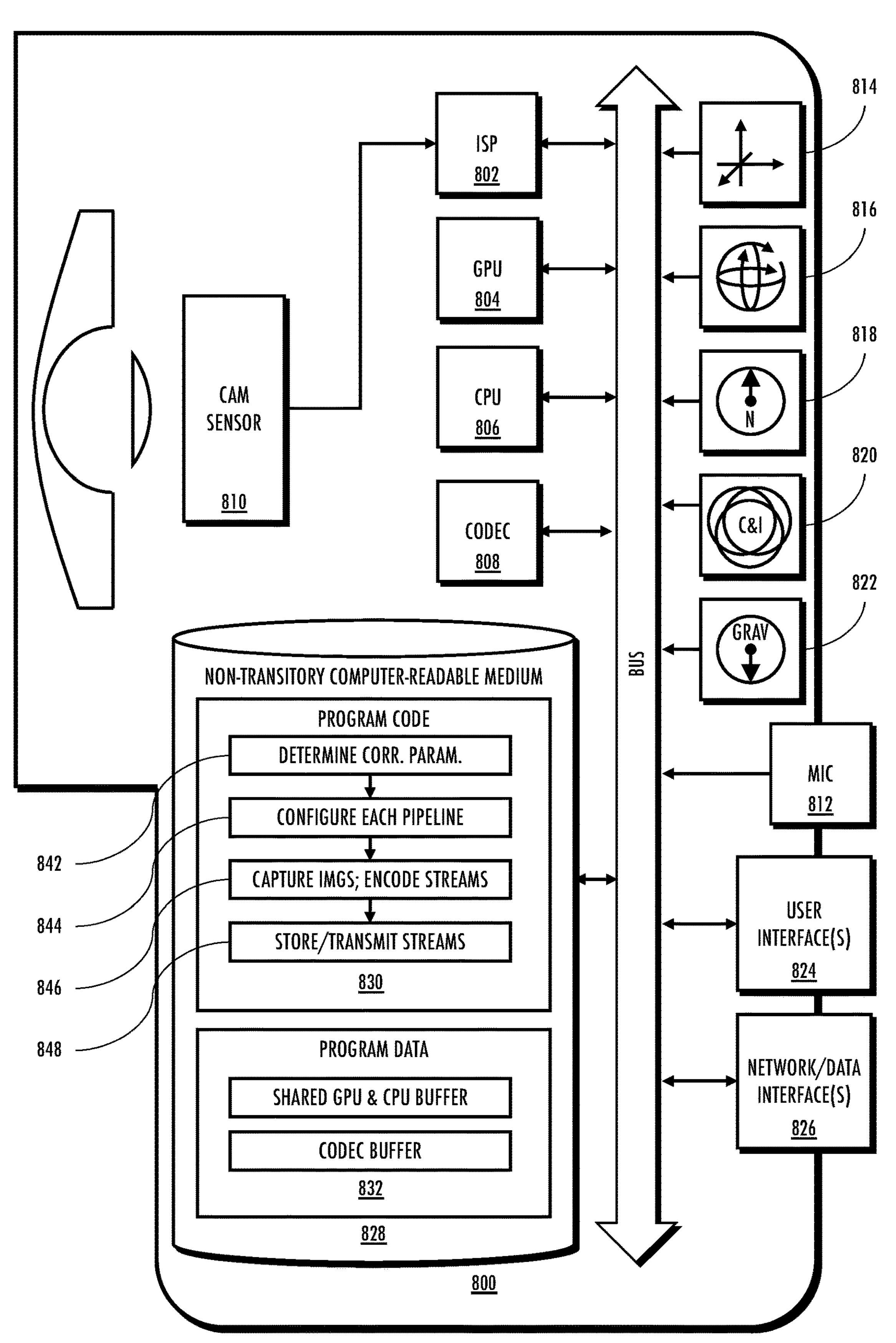
FIG. 8 is a logical block diagram of an exemplary capture device, in accordance with various aspects of the present disclosure.

FIG. 8 is a logical block diagram of an exemplary capture device 800. The capture device 800 includes: a sensor subsystem, a user interface subsystem, a communication subsystem, a control and data subsystem, and a bus to enable data transfer. The following discussion provides a specific discussion of the internal operations, design considerations, and/or alternatives, for each subsystem of the exemplary capture device 800.

Functional Overview of the Sensor Subsystem

Functionally, the sensor subsystem senses the physical environment and captures and/or records the sensed environment as data. In some embodiments, the sensor data may be stored as a function of capture time (so-called "tracks"). Tracks may be synchronous (aligned) or asynchronous (non-aligned) to one another. In some embodiments, the sensor data may be compressed, encoded, and/or encrypted as a data structure (e.g., MPEG, WAV, etc.)

The illustrated sensor subsystem includes: a camera sensor 810, a microphone 812, an accelerometer (ACCL 814), a gyroscope (GYRO 816), and a magnetometer (MAGN 818).

Other sensor subsystem implementations may multiply, combine, further subdivide, augment, and/or subsume the foregoing functionalities within these or other subsystems. For example, two or more cameras may be used to capture panoramic (e.g., wide or 360°) or stereoscopic content. Similarly, two or more microphones may be used to record stereo sound.

In some embodiments, the sensor subsystem is an integral part of the capture device 800. In other embodiments, the sensor subsystem may be augmented by external devices and/or removably attached components (e.g., hot-shoe/cold-shoe attachments, etc.) The following sections provide detailed descriptions of the individual components of the sensor subsystem.

Camera Implementations and Design Considerations

In one exemplary embodiment, a camera lens bends (distorts) light to focus on the camera sensor 810. In one specific implementation, the optical nature of the camera lens is mathematically described with a lens polynomial. More generally however, any characterization of the camera lens' optical properties may be substituted with equal success; such characterizations may include without limitation: polynomial, trigonometric, logarithmic, look-up-table, and/or piecewise or hybridized functions thereof. In one variant, the camera lens provides a wide field-of-view greater than 90°; examples of such lenses may include e.g., panoramic lenses 120° and/or hyper-hemispherical lenses 180°.

In one specific implementation, the camera sensor 810 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image.

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning". Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

More generally however, the various techniques described herein may be broadly applied to any camera assembly; including e.g., narrow field-of-view (30° to 90°) and/or stitched variants (e.g., 360° panoramas). While the foregoing techniques are described in the context of perceptible light, the techniques may be applied to other EM radiation capture and focus apparatus including without limitation: infrared, ultraviolet, and/or X-ray, etc.

Microphone Implementations and Design Considerations

In one specific implementation, the microphone 812 senses acoustic vibrations and converts the vibrations to an electrical signal (via a transducer, condenser, etc.) The electrical signal may be further transformed to frequency domain information. The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.)

More generally however, the various techniques described herein may be broadly applied to any integrated or handheld microphone or set of microphones including e.g., boom and/or shotgun-style microphones. While the foregoing techniques are described in the context of a single microphone, multiple microphones may be used to collect stereo sound and/or enable audio processing. For example, any number of individual microphones can be used to constructively and/or destructively combine acoustic waves (also referred to as beamforming).

Inertial Measurement Unit (IMU) Implementations and Design Considerations

The inertial measurement unit (IMU) includes one or more accelerometers, gyroscopes, and/or magnetometers. In one specific implementation, the accelerometer (ACCL 814) measures acceleration and gyroscope (GYRO 816) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 820). In one specific implementation, the magnetometer (MAGN 818) may provide a magnetic north vector (which may be used to "north lock" video and/or augment location services such as GPS), similarly the accelerometer (ACCL 814) may also be used to calculate a gravity vector (GRAV 822).

Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both device direction and speed).

More generally, however, any scheme for detecting device velocity (direction and speed) may be substituted with equal success for any of the foregoing tasks. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Functional Overview of the User Interface Subsystem

Functionally, the user interface subsystem 824 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 824 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Other user interface subsystem 824 implementations may multiply, combine, further subdivide, augment, and/or subsume the foregoing functionalities within these or other subsystems. For example, the audio input may incorporate elements of the microphone (discussed above with respect to the sensor subsystem). Similarly, IMU based input may incorporate the aforementioned IMU to measure "shakes", "bumps" and other gestures.

In some embodiments, the user interface subsystem 824 is an integral part of the capture device 800. In other embodiments, the user interface subsystem may be augmented by external devices (such as the connected device 900, discussed below) and/or removably attached components (e.g., hot-shoe/cold-shoe attachments, etc.) The following sections provide detailed descriptions of the individual components of the sensor subsystem.

Touchscreen and Buttons Implementation and Design Considerations

In some embodiments, the user interface subsystem 824 may include a touchscreen panel. A touchscreen is an assembly of a touch-sensitive panel that has been overlaid on a visual display. Typical displays are liquid crystal displays (LCD), organic light emitting diodes (OLED), and/or active-matrix OLED (AMOLED). Touchscreens are commonly used to enable a user to interact with a dynamic display, this provides both flexibility and intuitive user interfaces. Within the context of action cameras, touchscreen displays are especially useful because they can be sealed (water-proof, dust-proof, shock-proof, etc.)

Most commodity touchscreen displays are either resistive or capacitive. Generally, these systems use changes in resistance and/or capacitance to sense the location of human finger(s) or other touch input. Other touchscreen technologies may include e.g., surface acoustic wave, surface capacitance, projected capacitance, mutual capacitance, and/or self-capacitance. Yet other analogous technologies may include e.g., projected screens with optical imaging and/or computer-vision.

In some embodiments, the user interface subsystem 824 may also include mechanical buttons, keyboards, switches, scroll wheels and/or other mechanical input devices. Mechanical user interfaces are usually used to open or close a mechanical switch, resulting in an differentiable electrical signal. While physical buttons may be more difficult to seal against the elements, they are nonetheless useful in low-power applications since they do not require an active electrical current draw. For example, many BLE applications may be triggered by a physical button press to further reduce GUI power requirements.

More generally, however, any scheme for detecting user input may be substituted with equal success for any of the foregoing tasks. While the foregoing techniques are described in the context of a touchscreen and physical buttons that enable user data entry, artisans of ordinary skill in the related arts will readily appreciate that any of their derivatives may be substituted with equal success.

Microphone/Speaker Implementation and Design Considerations

Audio input may incorporate a microphone and codec (discussed above) with a speaker. As previously noted, the microphone can capture and convert audio for voice commands. For audible feedback, the audio codec may obtain audio data and decode the data into an electrical signal. The electrical signal can be amplified and used to drive the speaker to generate acoustic waves.

As previously noted, the microphone and speaker may have any number of microphones and/or speakers for beamforming. For example, two speakers may be used to provide stereo sound. Multiple microphones may be used to collect both the user's vocal instructions as well as the environmental sounds.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

The illustrated network/data interface 826 may include network interfaces including, but not limited to: Wi-Fi, Bluetooth, Global Positioning System (GPS), USB, and/or Ethernet network interfaces. Additionally, the network/data interface 826 may include data interfaces such as: SD cards (and their derivatives) and/or any other optical/electrical/magnetic media (e.g., MMC cards, CDs, DVDs, tape, etc.)

Network Interface Implementation and Design Considerations

The communication subsystem 826 of the capture device 800 may include one or more radios and/or modems. In one exemplary embodiment, the radio and modem are configured to communicate over a Bluetooth Low Energy (BLE) network. As used herein, the term "modem" refers to a modulator-demodulator for converting computer data (digital) into a waveform (baseband analog). The term "radio" refers to the front-end portion of the modem that upconverts and/or downconverts the baseband analog waveform to/from the RF carrier frequency.

While the foregoing discussion is presented in the context of Bluetooth Low Energy (BLE) communication networks, artisans of ordinary skill in the related arts will readily appreciate that other communication subsystems may be substituted with equal success (e.g., $5^{th}/6^{th}$ Generation (5G/6G) cellular networks, Wi-Fi, etc.) Furthermore, the techniques described throughout may be applied with equal success to wired networking devices. Examples of wired communications include without limitation Ethernet, USB, PCI-e. Additionally, some applications may operate within mixed environments and/or tasks. In such situations, the multiple different connections may be provided via multiple different communication protocols. Still other network connectivity solutions may be substituted with equal success.

More generally, any scheme for transmitting data over transitory media may be substituted with equal success for any of the foregoing tasks.

Data Interface Implementation and Design Considerations

The communication subsystem of the capture device 800 may include one or more data interfaces for removeable media. In one exemplary embodiment, the capture device 800 may read and write from a Secure Digital (SD) card or similar card memory.

While the foregoing discussion is presented in the context of SD cards, artisans of ordinary skill in the related arts will readily appreciate that other removeable media may be substituted with equal success (flash drives, MMC cards, etc.) Furthermore, the techniques described throughout may be applied with equal success to optical media (e.g., DVD, CD-ROM, etc.).

More generally, any scheme for storing data to non-transitory media may be substituted with equal success for any of the foregoing tasks.

Functional Overview of the Control and Data Processing Subsystem

Functionally, the control and data processing subsystems are used to read/write and store data to effectuate calculations and/or actuation of the sensor subsystem, user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 8, the control and data subsystem may include one or more of: a central processing unit (CPU 806), an image signal processor (ISP 802), a graphics processing unit (GPU 804), a codec 808, and a non-transitory computer-readable medium 828 that stores program instructions and/or data.

Processor-Memory Implementations and Design Considerations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU (such as shown in FIG. 8) may be primarily used to control device operation and/or perform tasks of arbitrary complexity/best effort. CPU operations may include, without limitation: general-purpose operating system (OS) functionality (power management, UX), memory management, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or autoexposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization. In many cases, the ISP may locally execute its own real-time operating system (RTOS) to schedule tasks of according to real-time constraints.

Much like the ISP, the GPU is primarily used to modify image data and may be heavily pipelined (seldom branches) and may incorporate specialized vector-matrix logic. Unlike the ISP however, the GPU often performs image processing acceleration for the CPU, thus the GPU may need to operate on multiple images at a time and/or other image processing tasks of arbitrary complexity. In many cases, GPU tasks may be parallelized and/or constrained by real-time budgets. GPU operations may include, without limitation: stabilization, lens corrections (stitching, warping, stretching), image corrections (shading, blending), noise reduction (filtering, etc.). GPUs may have much larger addressable space that can access both local cache memory and/or pages of system virtual memory. Additionally, a GPU may include multiple parallel cores and load balancing logic to e.g., manage power consumption and/or performance. In some cases, the GPU may locally execute its own operating system to schedule tasks according to its own scheduling constraints (pipelining, etc.).

The hardware codec converts image data to an encoded data for transfer and/or converts encoded data to image data for playback. Much like ISPs, hardware codecs are often designed according to specific use cases and heavily commoditized. Typical hardware codecs are heavily pipelined, may incorporate discrete cosine transform (DCT) logic (which is used by most compression standards), and often have large internal memories to hold multiple frames of video for motion estimation (spatial and/or temporal). As with ISPs, codecs are often bottlenecked by network connectivity and/or processor bandwidth, thus codecs are seldom parallelized and may have specialized data structures (e.g., registers that are a multiple of an image row width, etc.). In some cases, the codec may locally execute its own operating system to schedule tasks according to its own scheduling constraints (bandwidth, real-time frame rates, etc.).

Other processor subsystem implementations may multiply, combine, further subdivide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the memory subsystem may be used to store data locally at the capture device 800. In one exemplary embodiment, data may be stored as non-transitory symbols (e.g., bits read from non-transitory computer-readable mediums.) In one specific implementation, the memory subsystem 828 is physically realized as one or more physical memory chips (e.g., NAND/NOR flash) that are logically separated into memory data structures. The memory subsystem may be bifurcated into program code 830 and/or program data 832. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In some embodiments, the program code may be statically stored within the capture device 800 as firmware. In other embodiments, the program code may be dynamically stored (and changeable) via software updates. In some such variants, software may be subsequently updated by external parties and/or the user, based on various access permissions and procedures.

Generalized Operation of the Capture Device

In one embodiment, the non-transitory computer-readable medium includes a routine that encodes multiple versions of media to preserve synchronization between one or more corresponding frames of the versions. When executed by the control and data subsystem, the routine causes the connected device to: determine a correspondence parameter for media streams; configure pipelines to generate the media streams according to the correspondence parameter; capture images and encode the images into media streams; and store and/or transmit the media streams.

In step 842, the routine determines a correspondence parameter for media streams. In one exemplary embodiment, the correspondence parameter defines an instantaneous decoder refresh (IDR) frame rate for a first resolution video (e.g., a main resolution video (MRV) stream) and a second resolution video (e.g., a low-resolution video (LRV) stream). Here, the correspondence parameter defines the correspondence between frame rates of the two media streams; in other words, an IDR frame of the first media stream directly corresponds to an IDR frame of the second media stream.

More generally, any correspondence parameter that ensures encoding correspondence for frames of the same type between the media streams may be substituted with equal success. For example, a 240 FPS data structure with a M=1, N=8 GOP data structure (1 IDR frame every 8 frames) may have the same number of IDR frames as a 30 FPS IDR-only version, etc. Similarly, the techniques could be broadly extended to time-aligned I-frames and even P-Frames or B-Frames. In some cases, the correspondence parameter may be used in conjunction with other synchronization protocols to ensure that the media streams maintain time-alignment of the IDR frames despite differences in e.g., clock drift, propagation delay, etc.

While the foregoing discussion is presented in the context of frames, any correspondence relationship between data structures may be substituted with equal success. For example, other media standards may use "slices" (e.g., H.264/MPEG-4 AVC), chunks, samples and/or any other hierarchical organizations. Thus the techniques could be broadly extended to pipelines that guarantee correspondence between slices, chunks, samples, etc. Furthermore, the described examples are broadly presented in the context of video, however the techniques may be broadly extended to any media including e.g., audio data, haptic media, and/or metadata.

In one exemplary embodiment, the correspondence parameter is determined based on a post-processing requirement. For example, a user that wants to create a "slow-mo" or "time lapse" effect may have a target frame rate; the target frame rate can be used to ensure that edits can be performed at a particular playback rate. In other embodiments, the correspondence parameter may be based on the limitations of another device or component. For example, a connected device may have hardware limitations or network bandwidth that cannot match the capture device's streaming capabilities. In such implementations, the frame rate may be set to ensure that the connected device can play the live stream (or a selectively parsed subset of the live stream) without issue. In some variants, the correspondence parameter may be received from another device (such as the connected device 900 or post-processing device 1000 described below). Still other variants, the correspondence parameter may be inferred based on other device feedback (e.g., dropped packets, rendering feedback, user input, etc.).

While the present discussion is presented in the context of two media streams, any number may be substituted with equal success. For example, a three-stream implementation might e.g., create a thumbnail stream for live display on the capture device, a low-resolution video (LRV) for quick edits within a connected device to capture user input, and a main resolution video (MRV) for post-processing. Other examples of such applications might include e.g. network streaming and/or computer-vision processing.

In step 844, the routine configures each pipeline of the capture device according to the correspondence parameter; at step 846, the routine captures images and encodes the images via the pipelines to generate media streams.

As a brief aside, a processing pipeline refers to a staged arrangement of processing elements such that the output of one stage is the input to another stage; this enables simultaneous execution of data within different stages. Thus, for example, an image sensor can continuously capture image data in a capture stage, a codec continuously encodes data in an encoding stage, etc. In one exemplary embodiment, a pipeline includes a capture sensor and a corresponding codec. More extensive pipelines may incorporate intermediary stages to e.g., provide image signal processing, electronic image stabilization, etc.

In one specific implementation, a main resolution pipeline operates in parallel with a low-resolution pipeline. In some cases, the main resolution pipeline may be synchronized in time to the low-resolution pipeline; in other cases, the pipelines may be offset in time (e.g., 1 second delay, etc.). This may be useful where information from one pipeline is used to inform the processing of the other pipeline. Examples of such applications are more broadly discussed within co-owned PCT Patent Application No. PCT/US23/62157 entitled "METHODS AND APPARATUS FOR REAL-TIME GUIDED ENCODING" filed Feb. 7, 2023, incorporated herein by reference in its entirety. For instance, an image processing pipeline (IPP) may leverage real-time guidance collected during an image signal processing stage (ISP) to inform codec operation.

Notably, each pipeline may configure itself differently based on the correspondence parameter. For example, the pipeline is free to select its frame rates and/or GOP structures so long as the correspondence parameter is met. In other words, each pipeline may independently manage its unconstrained aspects of pipeline operation. Additionally, while the correspondence parameter is described within the context of encoder frame timing constraints, it is appreciated that multiple other stages of the pipeline may be affected by the correspondence parameter. For example, IDR encoding may require access to significant amounts of image data; this may entail larger memory buffer allocations and/or faster memory access through each stage of the pipeline.

More generally, artisans of ordinary skill in the related arts will readily appreciate that pipelines may be differently configured to serve different applications (e.g., small size for quickly rendering edits, high detail to maximize post-processing quality, etc.). While each pipeline independently encodes output data structures for its own application, the correspondence parameter ensures that the resulting output data structures have portions that directly correspond to one another (e.g., two sets of IDR frames that directly correspond to one another).

In step 848, the routine stores and/or transmits the media streams. In one embodiment, a media stream may be written to a removeable media device or other non-transitory computer-readable medium. As but one such example, a main resolution video (MRV) and/or low-resolution video (LRV) may be stored to an SD card.

In one embodiment, a media stream may be transmitted to another connected device for display and/or post-processing. For example, a selectively parsed ("picked") video may be live streamed; this allows a user to use the connected device to provide user input, etc. In one specific implementation, the low-resolution video is parsed down to an IDR-only version. Each IDR frame is independently decodable, thus an IDR-only stream can be directly rendered with minimal commodity codec memory resources (i.e., IDR-only frames do not reference other frames, thus look-forward and look-backward buffers are unnecessary).

Notably, frames of the same type have correspondences in each of the aforementioned streams. More generally, this relationship may be preserved in whole, or part, through encoding or other lossy techniques. While the aforementioned examples describe an IDR-only version of the LRV that preserves the frame rate, other implementations may allow varying levels of hierarchical preservation. For example, two streams that have corresponding anchor frames (e.g., IDR-Frames, I-Frames, and P-Frames) could partially preserve frame correspondence by preferentially culling anchor frames (e.g., P-frames before I-Frames, and I-frames before IDR-Frames.) More generally, artisans of ordinary skill in the related arts will readily appreciate that other selective parsing techniques may be substituted with equal success.

Functional Overview of the Connected Device

Functionally, a "connected device" 900 refers to a device that can connect-to and play a live stream from a capture device 800. In some variants, the connected device may also be used to control operation of the capture device 800; e.g., a smart phone application may be used to start capture, stop capture, adjust various capture parameters, and/or annotate the capture (e.g., identify specific frames as "highlights", key frames, etc.). As previously alluded to, the connected device 900 may explicitly provide its component capabilities to the capture device 800. For example, the connected device may advertise its parameters as part of the discovery, pairing, and/or configuration process, and/or feedback during a live stream.

The connected device has many similarities in operation and implementation to the capture device which are not further discussed; the following discussion provides a discussion of the internal operations, design considerations, and/or alternatives, that are specific to connected device operation.

Figure 9:
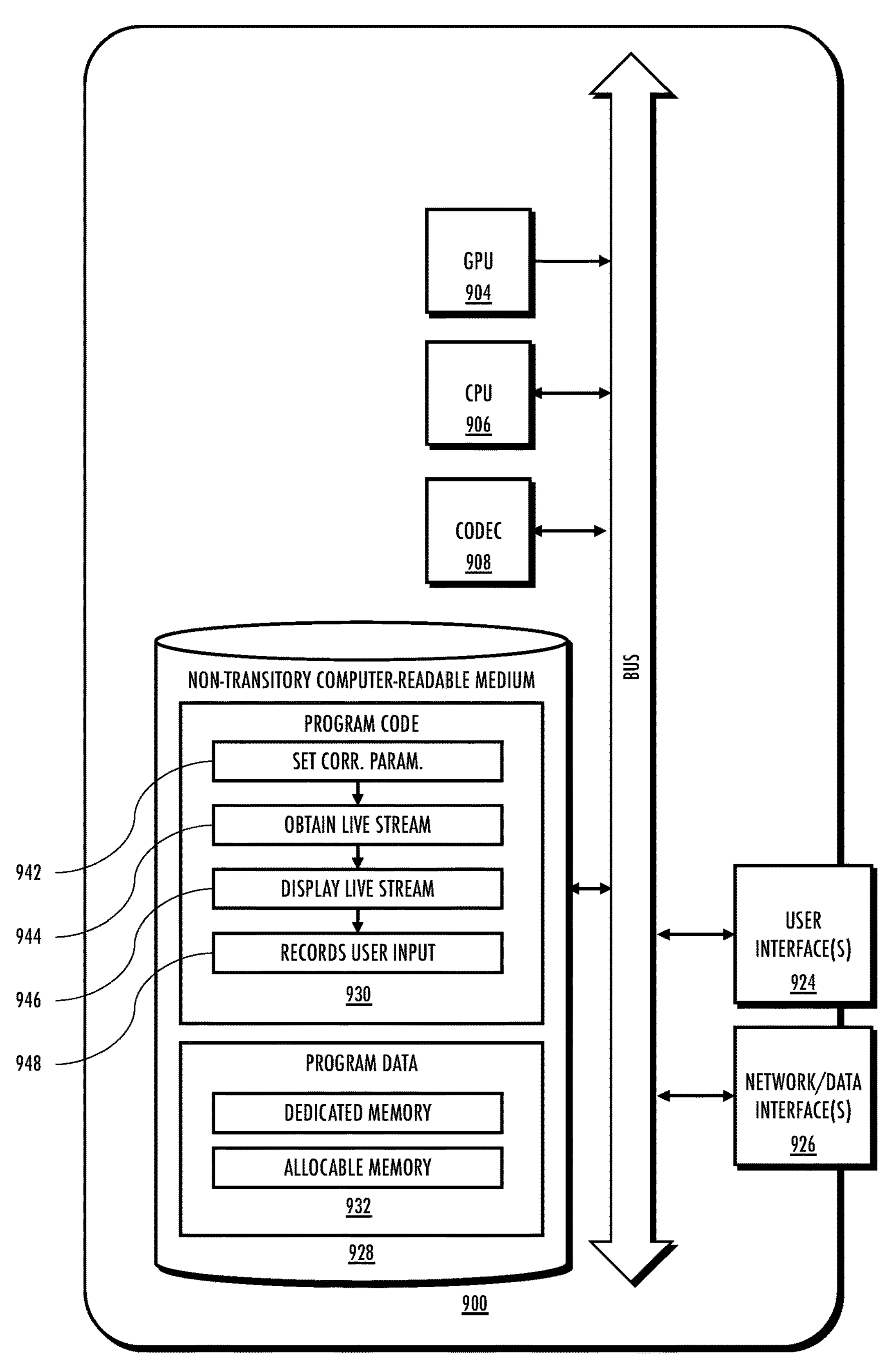
FIG. 9 is a logical block diagram of an exemplary connected device, in accordance with various aspects of the present disclosure.

FIG. 9 is a logical block diagram of an exemplary connected device 900. The connected device 900 includes: a user interface subsystem, a communication subsystem, a control and data subsystem, and a bus to enable data transfer. The following discussion provides a specific discussion of the internal operations, design considerations, and/or alternatives, for each subsystem of the exemplary connected device 900.

Functional Overview of the User Interface Subsystem

Functionally, the user interface subsystem 924 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 924 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

User Interface Subsystem Considerations for Different Device Types

While the foregoing discussions have been presented within the context of a smart phone, a variety of other devices are commonly used in the mobile device ecosystem including without limitation: laptops, tablets, smart phones, smart watches, smart glasses, and/or other electronic devices. These different device-types often come with different user interfaces and/or capabilities.

In laptop embodiments, user interface devices may include both keyboards, mice, touchscreens, microphones and/speakers. Laptop screens are typically quite large, providing display sizes well more than 2K (2560×1440), 4K (3840×2160), and potentially even higher. In many cases, laptop devices are less concerned with outdoor usage (e.g., water resistance, dust resistance, shock resistance) and often use mechanical button presses to compose text and/or mice to maneuver an on-screen pointer.

In terms of overall size, tablets are like laptops and may have display sizes well more than 2K (2560×1440), 4K (3840×2160), and potentially even higher. Tablets tend to eschew traditional keyboards and rely instead on touchscreen and/or stylus inputs.

Smart phones are smaller than tablets and may have display sizes that are significantly smaller, and non-standard. Common display sizes include e.g., 2400×1080, 2556×1179, 2796×1290, etc. Smart phones are highly reliant on touchscreens but may also incorporate voice inputs. Virtualized keyboards are quite small and may be used with assistive programs (to prevent mis-entry).

Smart watches and smart glasses have not had widespread market adoption but will likely become more popular over time. Their user interfaces are currently quite diverse and highly subject to implementation.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) In contrast, the data interfaces are configured to read/write data to a removeable non-transitory computer-readable medium (e.g., flash drive or similar memory media).

The illustrated network/data interface 926 may include network interfaces including, but not limited to: Wi-Fi, Bluetooth, Global Positioning System (GPS), USB, and/or Ethernet network interfaces. Additionally, the network/data interface subsystem 826 may include data interfaces such as: SD cards (and their derivatives) and/or any other optical/electrical/magnetic media (e.g., MMC cards, CDs, DVDs, tape, etc.)

Functional Overview of the Control and Data Processing Subsystem

Functionally, the control and data processing subsystems are used to read/write and store data to effectuate calculations and/or actuation of the user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 9, the control and data subsystem may include one or more of: a central processing unit (CPU 906), a graphics processing unit (GPU 904), a codec 908, and a non-transitory computer-readable medium 928 that stores program instructions and/or data. In the illustrated embodiment, the memory subsystem may be bifurcated into program code 930 and/or program data 932. Notably, smart phones and similar devices may have memory architectures that have some tasks that operate in real-time (or near real-time), and other tasks that operate at best effort. Thus, in some variants, the program data may be further organized according to dedicated memory spaces which guarantee performance (e.g., latency, access times, etc.) and/or freely allocable memory which is more flexible.

Generalized Operation of the Connected Device

In one embodiment, the non-transitory computer-readable medium includes a routine that displays a first media stream and records user input for post-processing within a second media stream. When executed by the control and data subsystem, the routine causes the connected device to: set a correspondence parameter for multiple media streams; obtain a first media stream captured according to the correspondence parameter; display the first media stream; and record user inputs to the first media stream for post-processing a second media stream.

In step 942, the routine sets a correspondence parameter for multiple media streams. For example, a smart phone might set a frame rate based on a desired main resolution video frame rate for slow-mo or time-lapse captures. In some variants, the connected device may query the capture device to determine acceptable correspondence parameters (e.g., supported frame rates); in other implementations, the connected device may request a correspondence parameter which is granted or denied by the capture device. Still other variants may utilize a negotiation, handshake, or other coordination scheme between the two devices.

Certain applications may require the connected device to update the capture device as to dynamically changing constraints. Consider, for example, a situation where the correspondence parameter is initially set based on network streaming conditions; at a later point in time, network connectivity may be affected which requires a change to the correspondence parameter. For example, a smart phone that is live streaming a video stream might need less frequent IDR frames during low bandwidth periods. Similarly, a smart phone might need to reduce its processing burden to handle other user demands. More generally, there may be a variety of real-time factors that necessitate dynamic adjustment to the correspondence properties of one or more of the media streams. Examples of such factors may include processing burden, memory availability, network connectivity, power consumption, user input, and/or any other connected device consideration.

In step 944, the routine obtains a first media stream captured according to the correspondence parameter; then the routine decodes and displays the first media stream (step 946). In one exemplary embodiment, the first media stream may be received as a live stream from the capture device. In one embodiment, the first media stream may be received as a quick edit resolution (e.g., the full low-resolution video (LRV)). In other embodiments, the first media stream may be received as a selectively parsed version (e.g., an IDR-only version of the LRV).

In step 948, the routine records user inputs to the first media stream for post-processing at a second media stream. As previously alluded to, frames of the same type have frame correspondences in other streams. The frame correspondence ensure that user inputs recorded relative to the first media stream will have a matching frame (or direct correspondence) in the second media stream. In other words, a user can make post-processing edits in-the-field (potentially in real-time/near-real-time), which are then seamlessly transferred into post-processing the main resolution video (MRV) at best effort. This is both more convenient and more precise; the edits may be directly transferred, and do not need to be made again.

As a side note, user input recorded via the connected device may have benefits over user input on the capture device. Action cameras are often small and ruggedized; the user interface may be both limited in function and difficult to use without disturbing the camera's positioning. Pressing a physical button might disturb certain types of sensitive exposures (e.g., time-lapse, low-light, etc.). Recording user input on a connected device allows the camera to adjust operation with no, or minimal, change to the camera positioning. Similarly, a smart phone screen (or similar user interface) may be used to virtually crop to a point-of-interest, rather than physically pointing the camera.

User edits may be recorded as metadata with reference to a specific frame. Examples of such edits may include e.g., shot placement, virtual filter effects (e.g., blur, color adjustment, etc.), stitching, warping, and/or other image corrections. Notably, the metadata may describe the parameters of the edits, allowing similar edits to be performed on a different media stream with other processing resources.

Functional Overview of the Post-Processing Device

Functionally, a "post-processing device" 1000 refers to a device that can obtain previously captured media from a capture device 800 and apply one or more effects afterwards ("post-capture processing", also commonly referred to as "post-processing"). In one exemplary embodiment, the post-processing device 1000 uses user input on a first media stream to edit a second media stream. In some variants, the user inputs may have been performed on the capture device 800; in other variants, the user inputs may have been recorded on a connected device 900 (used in combination with the capture device 800). User inputs might be used to e.g., start capture, stop capture, adjust various capture parameters, and/or annotate the capture (e.g., identify specific frames as "highlights", key frames, etc.).

The connected device has many similarities in operation and implementation to the capture device which are not further discussed; the following discussion provides a discussion of the internal operations, design considerations, and/or alternatives, that are specific to connected device operation.

Figure 10:
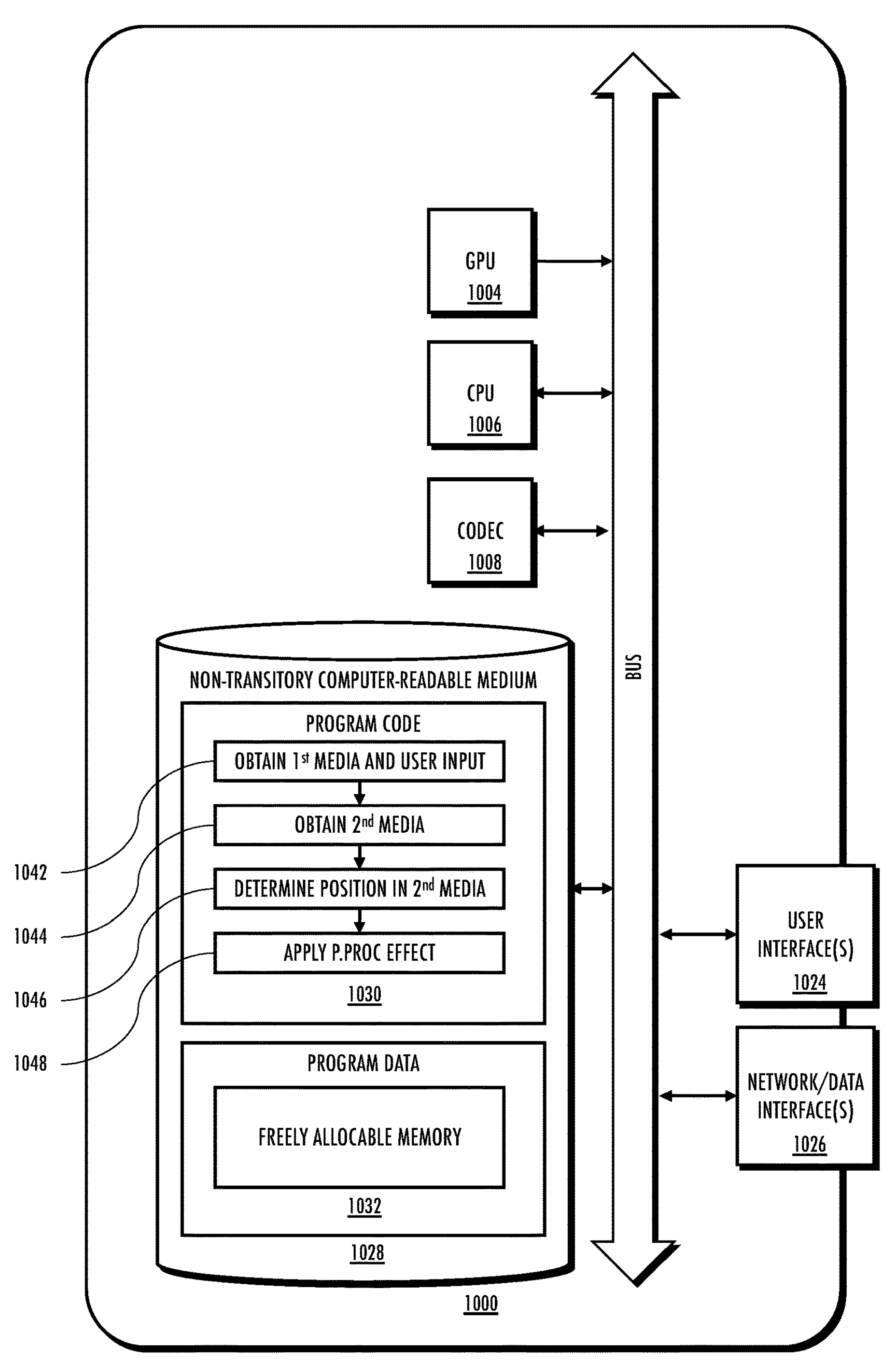
FIG. 10 is a logical block diagram of an exemplary post-processing device, in accordance with various aspects of the present disclosure.

FIG. 10 is a logical block diagram of an exemplary post-processing device 1000. The post-processing device 1000 includes: a user interface subsystem, a communication subsystem, a control and data subsystem, and a bus to enable data transfer. The following discussion provides a specific discussion of the internal operations, design considerations, and/or alternatives, for each subsystem of the exemplary post-processing device 1000.

Functional Overview of the User Interface Subsystem

Functionally, the user interface subsystem 1024 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 1024 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

User Interface Subsystem Considerations for Different Device Types

While the foregoing discussions have been presented within the context of a laptop, a variety of other devices are commonly used in the mobile device ecosystem including without limitation: laptops, tablets, smart phones, smart watches, smart glasses, and/or other electronic devices. These different device-types often come with different user interfaces and/or capabilities.

In laptop embodiments, user interface devices may include both keyboards, mice, touchscreens, microphones and/speakers. Laptop screens are typically quite large, providing display sizes well more than 2K (2560×1440), 4K (3840×2160), and potentially even higher. In many cases, laptop devices are less concerned with outdoor usage (e.g., water resistance, dust resistance, shock resistance) and often use mechanical button presses to compose text and/or mice to maneuver an on-screen pointer.

In terms of overall size, tablets are like laptops and may have display sizes well more than 2K (2560×1440), 4K (3840×2160), and potentially even higher. Tablets tend to eschew traditional keyboards and rely instead on touchscreen and/or stylus inputs.

Smart phones are smaller than tablets and may have display sizes that are significantly smaller, and non-standard. Common display sizes include e.g., 2400×1080, 2556×1179, 2796×1290, etc. Smart phones are highly reliant on touchscreens but may also incorporate voice inputs. Virtualized keyboards are quite small and may be used with assistive programs (to prevent mis-entry).

Smart watches and smart glasses have not had widespread market adoption but will likely become more popular over time. Their user interfaces are currently quite diverse and highly subject to implementation.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) In contrast, the data interfaces are configured to read/write data to a removeable non-transitory computer-readable medium (e.g., flash drive or similar memory media).

The illustrated network/data interface 1026 may include network interfaces including, but not limited to: Wi-Fi, Bluetooth, Global Positioning System (GPS), USB, and/or Ethernet network interfaces. Additionally, the network/data interface subsystem 826 may include data interfaces such as: SD cards (and their derivatives) and/or any other optical/electrical/magnetic media (e.g., MMC cards, CDs, DVDs, tape, etc.)

Functional Overview of the Control and Data Processing Subsystem

Functionally, the control and data processing subsystems are used to read/write and store data to effectuate calculations and/or actuation of the user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 10, the control and data subsystem may include one or more of: a central processing unit (CPU 1006), a graphics processing unit (GPU 1004), a codec 1008, and a non-transitory computer-readable medium 1028 that stores program instructions and/or data. In the illustrated embodiment, the memory subsystem may be bifurcated into program code 1030 and/or program data 1032. Most post-processing devices have memory architectures that handle many tasks in parallel at best effort. Thus, in some variants, the program data (and in some cases, program code) may be stored and retrieved from freely allocable memory to preserve overall system flexibility.

Generalized Operation of the Post-Processing Device

In one embodiment, the non-transitory computer-readable medium includes a routine that obtains user input recorded relative to a first media stream and applies corresponding post-processing to a second media stream. When executed by the control and data subsystem, the routine causes the connected device to: obtain a first media stream and recorded user input; obtain a second media stream that corresponds to the first media stream according to a correspondence parameter; for each recorded user input, determine a corresponding location within the second media stream; and apply a post-processing effect to the second media stream at the corresponding location.

In step 1042, the routine obtains a first media stream and recorded user input. In one exemplary embodiment, the first media stream and recorded user input may be received as a media file stored on removeable media. In other embodiments, the first media stream and/or recorded user input may be received as a live stream from e.g., a capture device or connected device. In one embodiment, the first media stream may be received as a quick edit resolution (e.g., the full low-resolution video (LRV)). In other embodiments, the first media stream may be received as a selectively parsed version (e.g., an IDR-only version of the LRV).

In step 1044, the routine obtains a second media stream that corresponds to the first media stream according to a correspondence parameter. In one exemplary embodiment, the second media stream may be received as a media file stored on removeable media. In some cases, the first media stream, recorded user input, and second media stream may be separate tracks of the same data structure. In other cases, the first media stream, recorded user input, and/or second media stream separately stored in different data structures. The data structures may be combined based on user input (e.g., a drag-and-drop interface within video editing software.

For each recorded user input, the routine determines a corresponding location within the second media stream (step 1046). As previously alluded to, frames of the same type have frame correspondences in other streams. Thus, user inputs recorded relative to the first media stream (or a selectively parsed version) will have a matching frame (or direct correspondence) in the second media stream. These frames may be directly located within the second media stream. Notably, the second media stream may be at a different frame rate and/or GOP structure; thus, direct correspondence provides an unambiguous reference (unlike time stamps which might not perfectly align due to differences in clocking, etc.).

In step 1048, the routine applies a post-processing effect to the second media stream at the corresponding location. As previously noted, edits may include e.g., shot placement, virtual filter effects (e.g., blur, color adjustment, etc.), stitching, warping, and/or other image corrections.

Functional Overview of the Communication Network

As used herein, a "communication network" 1100 refers to an arrangement of logical nodes that enables data communication between endpoints (an endpoint is also a logical node). Each node of the communication network may be addressable by other nodes; typically, a unit of data (a data packet) may be traverse across multiple nodes in "hops" (a segment between two nodes). Functionally, the communication network enables nodes (e.g., capture devices and/or connected devices) to communicate with one another.

Communication Networks, Implementation and Design Considerations

While the present disclosure discusses an ad hoc communication network's role for capture devices and connected devices, other systems may use more permanent communication network technologies (e.g., Bluetooth BR/EDR, Wi-Fi, 5G/6G cellular networks, etc.). For example, an action camera may use a Wi-Fi network to stream media to a smart phone. In other examples, the action camera may use a cellular network to stream media to a remote node over the Internet. These technologies are briefly discussed below.

So-called 5G cellular network standards are promulgated by the 3$^{rd}$ Generation Partnership Project (3GPP) consortium. The 3GPP consortium periodically publishes specifications that define network functionality for the various network components. For example, the 5G system architecture is defined in 3GPP TS 23.501 (*System Architecture for the* 5*G System* (5*GS*), version 17.5.0, published Jun. 15, 2022; incorporated herein by reference in its entirety). As another example, the packet protocol for mobility management and session management is described in 3GPP TS 24.501 (*Non-Access-Stratum* (*NAS*) *Protocol for* 5*G System* (5*G*); *Stage* 3, version 17.5.0, published Jan. 5, 2022; incorporated herein by reference in its entirety).

Currently, there are three main application areas for the enhanced capabilities of 5G. They are Enhanced Mobile Broadband (eMBB), Ultra Reliable Low Latency Communications (URLLC), and Massive Machine Type Communications (mMTC).

Enhanced Mobile Broadband (eMBB) uses 5G as a progression from 4G LTE mobile broadband services, with faster connections, higher throughput, and more capacity. eMBB is primarily targeted toward traditional "best effort" delivery (e.g., smart phones); in other words, the network does not provide any guarantee that data is delivered or that delivery meets any quality of service. In a best effort network, all users obtain best effort service such that the overall network is resource utilization is maximized. In these network slices, network performance characteristics such as network delay and packet loss depend on the current network traffic load and the network hardware capacity. When network load increases, this can lead to packet loss, retransmission, packet delay variation, and further network delay, or even timeout and session disconnect.

Ultra-Reliable Low-Latency Communications (URLLC) network slices are optimized for "mission critical" applications that require uninterrupted and robust data exchange. URLLC uses short-packet data transmissions which are easier to correct and faster to deliver. URLLC was originally envisioned to provide reliability and latency requirements to support real-time data processing requirements, which cannot be handled with best effort delivery.

Massive Machine-Type Communications (mMTC) was designed for Internet of Things (IoT) and Industrial Internet of Things (IIoT) applications. mMTC provides high connection density and ultra-energy efficiency. mMTC allows a single GNB to service many different devices with relatively low data requirements.

Wi-Fi is a family of wireless network protocols based on the IEEE 802.11 family of standards. Like Bluetooth, Wi-Fi operates in the unlicensed ISM band, and thus Wi-Fi and Bluetooth are frequently bundled together. Wi-Fi also uses a time-division multiplexed access scheme. Medium access is managed with carrier sense multiple access with collision avoidance (CSMA/CA). Under CSMA/CA. During Wi-Fi operation, stations attempt to avoid collisions by beginning transmission only after the channel is sensed to be "idle"; unfortunately, signal propagation delays prevent perfect channel sensing. Collisions occur when a station receives multiple signals on a channel at the same time and are largely inevitable. This corrupts the transmitted data and can require stations to re-transmit. Even though collisions prevent efficient bandwidth usage, the simple protocol and low cost has greatly contributed to its popularity. As a practical matter, Wi-Fi access points have a usable range of ~50 ft indoors and are mostly used for local area networking in best effort, high throughput applications.

ADDITIONAL CONFIGURATION CONSIDERATIONS

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant, or implementation. The appearances of such phrases in various places in the specification are not necessarily all referring to the same embodiment, variant, or implementation.

As used herein, the term "computer program" or "software" is meant to include any sequence of human or machine cognizable steps which perform a function. Such program may be rendered in virtually any programming language or environment including, for example, Python, JavaScript, Java, C #/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus configured to selectively parse a live stream, comprising:

a camera sensor;

a first codec and a second codec;

a removeable media interface;

a processor; and a non-transitory computer-readable medium comprising instructions that when executed by the processor cause the apparatus to:

determine an instantaneous decoder refresh frame rate for a first video stream and a second video stream;

configure the first codec to generate the first video stream according to the instantaneous decoder refresh frame rate and the second codec to generate the second video stream according to the instantaneous decoder refresh frame rate;

capture images via the camera sensor and encode the images via the first codec and the second codec;

store the first video stream and the second video stream to a removeable media; and selectively parse the first video stream into a third video stream.

2. The apparatus of claim 1, where the first codec is configured for a first resolution and the second codec is configured for a second resolution greater than the first resolution.

3. The apparatus of claim 1, where the first codec is configured for a first frame rate and the second codec is configured for the first frame rate.

4. The apparatus of claim 3, where the third video stream comprises a second frame rate that is slower than the first frame rate.

5. The apparatus of claim 1, where the third video stream comprises only instantaneous decoder refresh frames.

6. The apparatus of claim 1, where the instantaneous decoder refresh frame rate is set based on a post-processing requirement.

7. The apparatus of claim 1, where the instantaneous decoder refresh frame rate is set based on a connected device limitation.

8. A method, comprising:

determining an instantaneous decoder refresh frame rate for a first video stream and a second video stream;

configuring a first codec to generate the first video stream according to the instantaneous decoder refresh frame rate and a second codec to generate the second video stream according to the instantaneous decoder refresh frame rate;

capturing images via a camera sensor and encoding the images via the first codec and the second codec;

storing the first video stream and the second video stream to a removeable media; and selectively parsing the first video stream into a third video stream.

9. The method of claim 8, further comprising configuring the first codec for a first resolution and the second codec for a second resolution greater than the first resolution.

10. The method of claim 8, configuring the first codec for a first frame rate and the second codec for the first frame rate.

11. The method of claim 10, where the third video stream comprises a second frame rate that is slower than the first frame rate.

12. The method of claim 8, where the third video stream comprises only instantaneous decoder refresh frames.

13. The method of claim 8, further comprising setting the instantaneous decoder refresh frame rate based on a post-processing requirement.

14. The method of claim 8, further comprising setting the instantaneous decoder refresh frame rate based on a connected device limitation.

15. An apparatus configured to selectively parse a live stream, comprising:

a camera sensor configured to capture images;

a first logic configured to determine an instantaneous decoder refresh frame rate;

a first codec configured to encode the images into a first video stream according to the instantaneous decoder refresh frame rate;

a second codec configured to encode the images into a second video stream according to the instantaneous decoder refresh frame rate;

a removeable media interface configured to store the first video stream and the second video stream to a removeable media; and a second logic configured to selectively parse the first video stream into a third video stream.

16. The apparatus of claim 15, where the first codec is configured to encode the first video stream at a first resolution and the second codec is configured to encode the second video stream at a second resolution greater than the first resolution.

17. The apparatus of claim 15, where the first codec is configured to encode the first video stream at a first frame rate and the second codec is configured to encode the second video stream at the first frame rate.

18. The apparatus of claim 17, where the third video stream is selectively parsed to a second frame rate that is slower than the first frame rate.

19. The apparatus of claim 15, where the third video stream is selectively parsed to include only instantaneous decoder refresh frames.

20. The apparatus of claim 15, where the instantaneous decoder refresh frame rate is set based on a post-processing requirement.

* * * * *